US012535766B2

(12) United States Patent
Kawasumi et al.

(10) Patent No.: US 12,535,766 B2
(45) Date of Patent: Jan. 27, 2026

(54) IMAGE FORMING APPARATUS

(71) Applicant: CANON KABUSHIKI KAISHA, Tokyo (JP)

(72) Inventors: Ryoichi Kawasumi, Ibaraki (JP); Yusuke Mitsui, Yamanashi (JP); Shigeyuki Sanmiya, Yamanashi (JP); Koji Kanda, Yamanashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/903,445

(22) Filed: Oct. 1, 2024

(65) Prior Publication Data

US 2025/0123588 A1 Apr. 17, 2025

(30) Foreign Application Priority Data

Oct. 13, 2023 (JP) ................................ 2023-177403

(51) Int. Cl.
*G03G 15/00* (2006.01)
*G03G 21/16* (2006.01)

(52) U.S. Cl.
CPC ......... *G03G 21/1652* (2013.01); *G03G 15/80* (2013.01)

(58) Field of Classification Search
CPC . G03G 15/80; G03G 21/1619; G03G 21/1652
USPC .................................. 399/90, 107, 110, 407
See application file for complete search history.

(56) References Cited

U.S. PATENT DOCUMENTS 8,960,673 B2 2/2015 Yoshida
2018/0013904 A1 * 1/2018 Hozono ............. H04N 1/00408

FOREIGN PATENT DOCUMENTS

JP 2014108842 A 6/2014

* cited by examiner

*Primary Examiner* — Hoan H Tran
(74) *Attorney, Agent, or Firm* — ROSSI, KIMMS & McDOWELL LLP

(57) ABSTRACT

Disclosed is an image forming apparatus including a main unit and a processing unit installed on an installation surface and configured to process the sheet discharged from a discharge portion. The processing unit includes a first connector electrically connected to the main unit; and a first positioning portion that protrudes from a bottom surface toward the installation surface. The main unit includes a second connector disposed, in a second direction, on a first side with respect to a sheet discharging position onto which the sheet is discharged from the discharge portion, the second direction crossing the first direction, and the second connector being electrically connected to the processing unit in a manner that the first connector is inserted into the second connector along the second direction; and a groove portion provided on the installation surface and engages with the first positioning portion.

15 Claims, 19 Drawing Sheets

IMAGE FORMING APPARATUS

BACKGROUND OF THE INVENTION

Field of the Invention

This invention relates to an image forming apparatus provided with a connector that can be connected to a processing unit that performs processes for a sheet discharged from the apparatus main body.

Description of the Related Art

In a conventional image forming apparatus of electrophotographic system, the processing units that performs various processes for the sheet can be attached to the apparatus. The processes include stitching the sheet with a staple, making a hole on the sheet with a punch, folding the sheet, and only conveying the discharged sheet.

Japanese Patent Application Laid-Open No. 2014-108842 discloses the configuration of an image forming apparatus, in which a finisher capable of stacking a large amount of sheets is disposed at a side surface of the main body of the image forming apparatus and a buffer path unit is attached for relaying and conveying the sheet from a discharge opening of the apparatus main body to the finisher. This buffer path unit is one of the processing unit described above.

This buffer path unit is attached to the apparatus main body by being inserted in the direction from the front side towards the back side of the image forming apparatus. For this purpose, the buffer path unit has a drawer connector provided on a tip portion (back side) in the inserting direction. According with the buffer path unit being inserted, a connector on the buffer path unit side fits into the connector on the apparatus main body side disposed in a position located on the back side of the apparatus main body to make an electrical connection with the apparatus main body.

However, in the apparatus of Japanese Patent Application Laid-Open No. 2014-108842, it is difficult to visually inspect the positions of the connector on the apparatus main body side and the connector on the unit side when the unit is attached to the apparatus main body. This makes difficult the fitting of the connector on the unit side into the connector on the apparatus main body, and accordingly it might be possible that the electrical connection between the unit and the apparatus main body is not properly performed.

SUMMARY OF THE INVENTION

A representative configuration of the present invention is an image forming apparatus comprising:

- a main unit including an image forming portion configured to form an image on a sheet;
- a discharge portion provided on the main unit, the discharge portion being configured to discharge the sheet from the main unit in a first direction; and
- a processing unit installed on an installation surface of the main unit and configured to process the sheet discharged from the discharge portion,
- wherein the processing unit includes:
  - a first connector electrically connected to the main unit; and
  - a first positioning portion that protrudes from a bottom surface of the processing unit toward the installation surface,
- wherein the main unit includes:
  - a second connector disposed, in a second direction, on a first side with respect to a sheet discharging position onto which the sheet is discharged from the discharge portion, the second direction crossing the first direction, and the second connector being electrically connected to the processing unit in a manner that the first connector is inserted into the second connector along the second direction; and
  - a groove portion provided on the installation surface and configured to engage with the first positioning portion,
- wherein the processing unit is capable of moving in the second direction with respect to the main unit in a state where the first positioning portion is engaged with the groove portion, and
- wherein by the engagement of the first positioning portion with the groove portion, a movement of the processing unit in the first direction with respect to the main unit is restricted to a range narrower than a movable range in the second direction.

Further features of the present invention will become apparent from the following description of exemplary embodiments with reference to the attached drawings.

DESCRIPTION OF THE EMBODIMENTS

Figure 1:
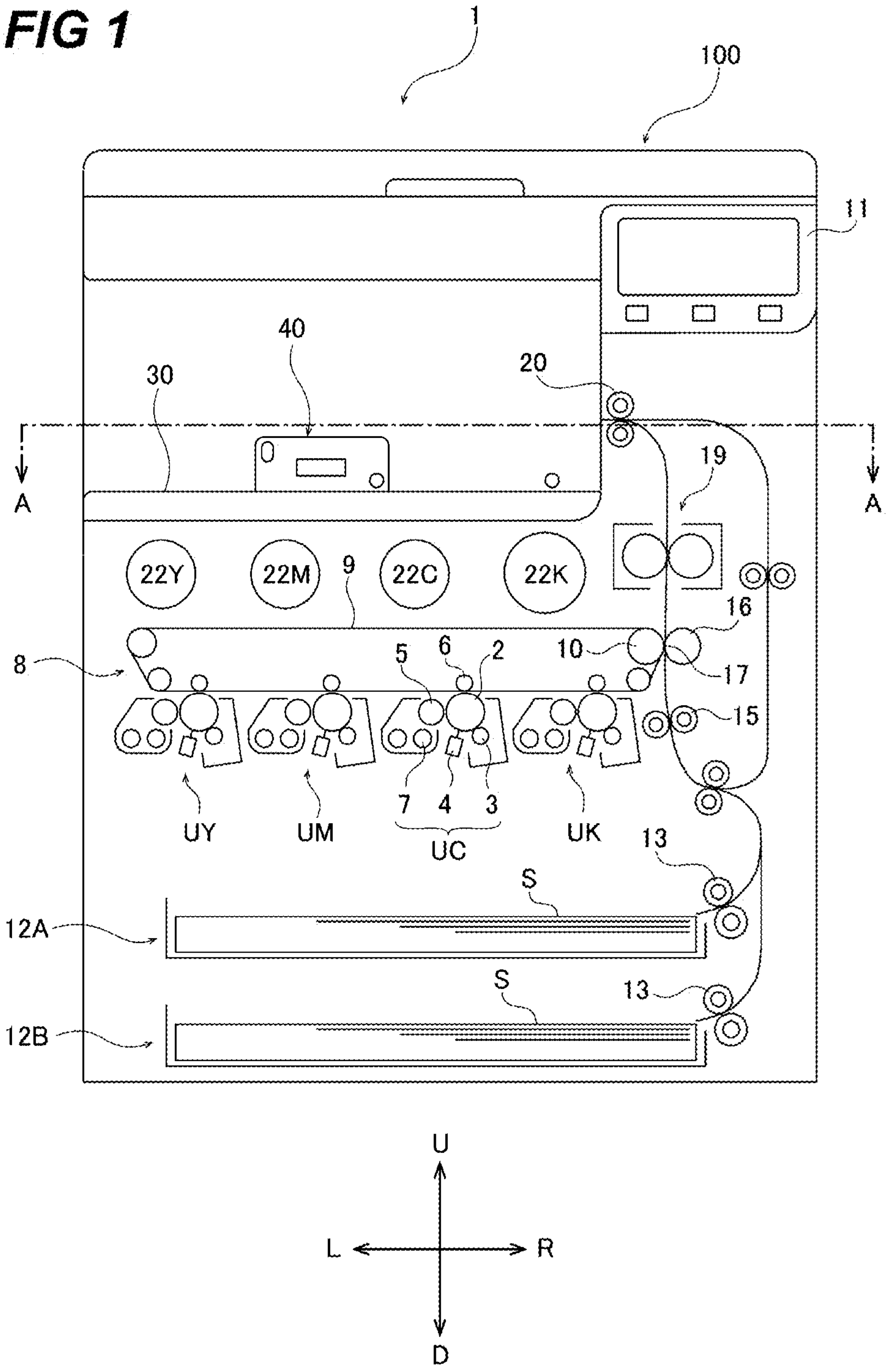
FIG. 1 is a schematic diagram showing a cross-sectional view of an image forming apparatus.

Hereinafter, with reference to the drawings, preferred embodiments of the present invention will be described in detail. However, the dimensions, materials, and relative positions of the components of the image forming apparatus described in the following is not intended to limit the scope of the invention to them alone. In the figures, the components to which the same reference character is attached have the same configuration or the effect and the duplicate description of these components is omitted as appropriate.

In the following description, the upward direction U, the downward direction D, the rightward direction R, the leftward direction L, the backward direction B, the forward direction F shown in FIGS. 1, 10 and so on are defined as follows. The side of the image forming apparatus 1 shown in FIGS. 1, 10 (and so on) on which the operation portion 11 is disposed is defined as front side and the opposite side of the front side is defined as back side. The direction from the back surface to the top surface of the drawing sheet is defined as forward direction, and the direction from the top surface to the back surface of the drawing sheet is defined as backward direction. With respect to the image forming unit UK that forms a black image, the side on which the image forming unit UY that forms a yellow image is disposed is defined as left side. With respect to the image forming unit UY that forms a yellow image, the side on which the image forming unit UK that forms a black image is disposed is defined as right side. The direction that is perpendicular to the forward/backward directions and the rightward/leftward directions and that is a vertical upward direction is defined as upward direction. The direction that is perpendicular to the forward/backward directions and the rightward/leftward directions and that is a vertical downward direction is defined as downward direction.

Further, in the following, the leftward/rightward directions are referred to as first directions, the forward/backward directions are referred to as second directions perpendicular to the first directions, the upward/downward directions are referred to as third directions perpendicular to the first directions and second directions.

(Image Forming Apparatus)

The image forming apparatus 1 will be described using FIG. 1 FIG. 1 is a schematic diagram showing a cross-sectional view of image forming apparatus according to the present embodiment viewed from the front side.

The image forming apparatus 1 shown in FIG. 1 is a four full color laser printer of tandem and intermediate transfer system using electrophotographic process as an example of an image forming apparatus. The image forming apparatus 1 forms a toner image on the sheet S based on the image information input to a control circuit portion (not shown) from an external host device (not shown) such as a personal computer.

At the substantially central portion of the apparatus main body 100 that is a main unit of the image forming apparatus 1, the image forming portions that sequentially form the toner images of yellow (Y), magenta (M), cyan (C) and black (B) are disposed.

The image forming units UY, UM, UC and UK as image forming portions that form toner images of respective colors have the substantially the same configuration as each other. To avoid complexity of the drawings, reference characters are attached only to the components of the image forming unit UC for the color cyan as a representative, and the reference characters for the other image forming unit UY, UM and UK are omitted.

Each of the four image forming unit UY, UM, UC and UK has a drum unit with the electrophotographic photosensitive body (hereinafter referred to as a photosensitive drum) 2 of a rotating drum type as an image bearing member, and the developing sleeve 5 that develops into a toner image. Each image forming unit is detachably attachable to the apparatus main body 100 as a main unit of the image forming apparatus 1 for exchange.

The drum unit has the photosensitive drum 2, the charging roller 3 that charges the photosensitive drum 2, a drum cleaning portion (not shown).

The developing unit has the developing sleeve 5 and the screw 7 that provides toner to the developing sleeve 5 and stirs the toner.

Between the drum unit and the developing unit, LED exposure unit 4 having LED elements is disposed.

Above the four image forming units UY, UM, UC and UK, the intermediate transfer belt unit 8 is disposed. The intermediate transfer belt unit 8 has the four primary transfer rollers 6 that are respectively opposed to the photosensitive drums 2 of respective colors, and the belt 9.

Under the four image forming units UY, UM, UC and UK, the sheet cassette unit 12 is disposed. The sheet cassette unit 12 includes the sheet cassette 12A disposed at a upper row and the sheet cassette 12B disposed at a lower row.

Above the intermediate transfer belt unit 8, the toner bottles 22Y, 22M, 22C and 22K are disposed. The toner bottles 22Y, 22M, 22C and 22K are detachably attachable to the main body for exchange and accommodate replenishing toner for the four image forming units UY, UM, UC and UK. Toner replenishment with proper amount at proper timing is performed from the corresponding toner bottles 22Y, 22M, 22C and 22K to the image forming units UY, UM, UC and UK, respectively, by a toner replenishing mechanism (not shown).

(Image Forming Process)

In the image forming process, latent images are respectively formed on the photosensitive drums 2 of the four image forming units UY, UM, UC and UK. Prior to this, as a preparatory operation, a high voltage is applied to the charging roller 3 pressed onto the photosensitive drum 2 so that the surface of the photosensitive drum 2 are uniformly charged according to the rotation of the photosensitive drum 2.

Next, a high voltage is applied to the developing sleeve 5 by way of a different path from that to the charging roller 3 so that the toner having electric charge inside the developing unit is coated on the surface of the developing sleeve 5. Inside the developing unit, the toner is conveyed and circulated at a high speed by the screw 7. The rotational speed of the screw 7 is relatively much higher than those of the developing sleeve 5 and the photosensitive drum 2 so that the coating of the toner to the developing sleeve 5 is uniformly performed without unevenness.

By the irradiation of the LED of the LED exposure unit 4 disposed between the drum unit and the developing unit, an electrostatic latent image is formed by a potential change on the surface of the photosensitive drum 2. The electrostatic latent image on the photosensitive drum 2 is developed into a toner image with toner on the developing sleeve 5.

The toner image on the photosensitive drum 2 is primarily transferred onto the surface of the belt 9 in the order of the colors described above according to the rotation of the belt 9 as an intermediate transfer member. As a result, the toner image in which four colors of Y, M, C and K are superimposed is formed on the belt 9.

On the right side of the apparatus main body 100 of the image forming apparatus 1, a sheet conveying path is disposed for conveying the sheet S from the lower position to the upper position. On the sheet conveying path, the feeding roller pair 13, the registration roller pair 15, the secondary transfer roller 16, the fixing device 19, the discharge roller pair 20 are sequentially disposed from the lower side toward the upper side. The secondary transfer roller 16 is abutted to the belt driving roller 10 on the right side of the intermediate transfer belt unit 8 via the belt 9 with a predetermined pressing force to form a secondary transfer nip portion 17 together with the belt 9.

Then, at a predetermined control timing, the feed roller pair 13 is driven and the sheets (recording materials, sheets of paper) S are separated and fed one sheet by one sheet from the sheet cassette unit 12 to be introduced into the sheet conveying path. The separated sheet S is then at a predetermined control timing introduced into the second transfer nip portion 17 by the registration roller pair 15 to be nipped while being conveyed. As a result, the toner image in which toner images of four colors are superimposed is secondarily transferred onto the sheet S in a batch so that an unfixed toner image is formed on the sheet S.

The sheet S output from the secondary transfer nip portion 17 is introduced into the fixing device 19 where it is subjected to fixing process for toner image with heat and pressure. The sheet S output from the fixing device 19 is discharged onto the inside space formed over the inside lower cover 30 disposed above the toner bottle unit 22 as image formed matter by the discharge roller pair 20. This means that the sheet discharging position is located in the inside space.

The discharge roller pair 20 is a discharge portion provided on the apparatus main body 100 that discharges the sheet S output from the apparatus main body 100 in the conveying direction (leftward direction in the first directions). The inside lower cover 30 has an installation surface where the processing unit is to be installed. The inside space is formed in the apparatus main body 100 by the installation surface of the inside lower cover 30 and the surface on which the discharge portion with discharge roller pair 20 is provided. The connector installation surface on which the main body connection portion 40 is disposed defines the inside space in the directions (second directions) crossing the conveying direction of the sheet S. The inside space has an opening portion that is open to the outside of the apparatus. The opening portion is at least open toward the front side of the image forming apparatus in the directions (second directions) crossing the conveying direction of the sheet S. The opening portion may be open to other directions (for example, the downstream side in the sheet conveying direction). When the processing unit is attached to the apparatus main body 100, the processing unit is inserted into the inside space from the opening portion. The inside lower cover 30 may serve as a receiving portion that receives the sheet discharged by the discharge roller pair 20.

(Processing Unit)

Next, a processing unit will be described which can be attached to the image forming apparatus. The image forming apparatus 1 has the processing unit that is detachably attachable to the apparatus main body 100.

The processing unit is inserted into the inside space of the apparatus main body 100 from the above described opening portion and is installed on the installation surface of the inside lower cover 30. The processing unit receives the sheet S discharged by the discharge roller pair 20 and performs a process.

Generally, sheets or bundles sheets after the image formation may be stitched by staples for every sheet or bundle, perforated by a punch, or folded in three or in the middle. Users who use a large amount of sheets tend to perform such processes.

Therefore, in order to provide high convenience to users by improving working efficiency of these processes, it is preferable for the image forming apparatus to be provided with a processing unit that can perform these processes automatically after the sheets are discharged.

Processing units which are attached to the apparatus main body 100 of the image forming apparatus that has the above described inside space are broadly classified as two kinds of inner fisher to be attached in the inside space of the apparatus main body 100 and saddle finisher to be attached to a side surface of the apparatus main body 100.

The inner finisher can be installed in the inside space of the image forming apparatus and is capable of performing processes for the sheet while keeping the installation area of the entire apparatus minimum.

The saddle finisher is disposed on a side surface of the image forming apparatus, so that a predetermined area for installation is necessary. On the other hand, a larger size is possible by the saddle finisher and more functions can be implemented than that of the inner finisher.

The above described processing units are often optional apparatuses that are selected and attached according to the user's demands. When a processing unit is not attached to the image forming apparatus, a sheet receiving tray is installed on the installation surface of the inside lower cover 30 or the sheet S is directly discharged on the installation surface of the inside lower cover 30. Therefore, although a processing unit is not attached, an image forming apparatus with the configuration in which a processing unit is attachable is the one that can be included in the present embodiment.

Figure 2:
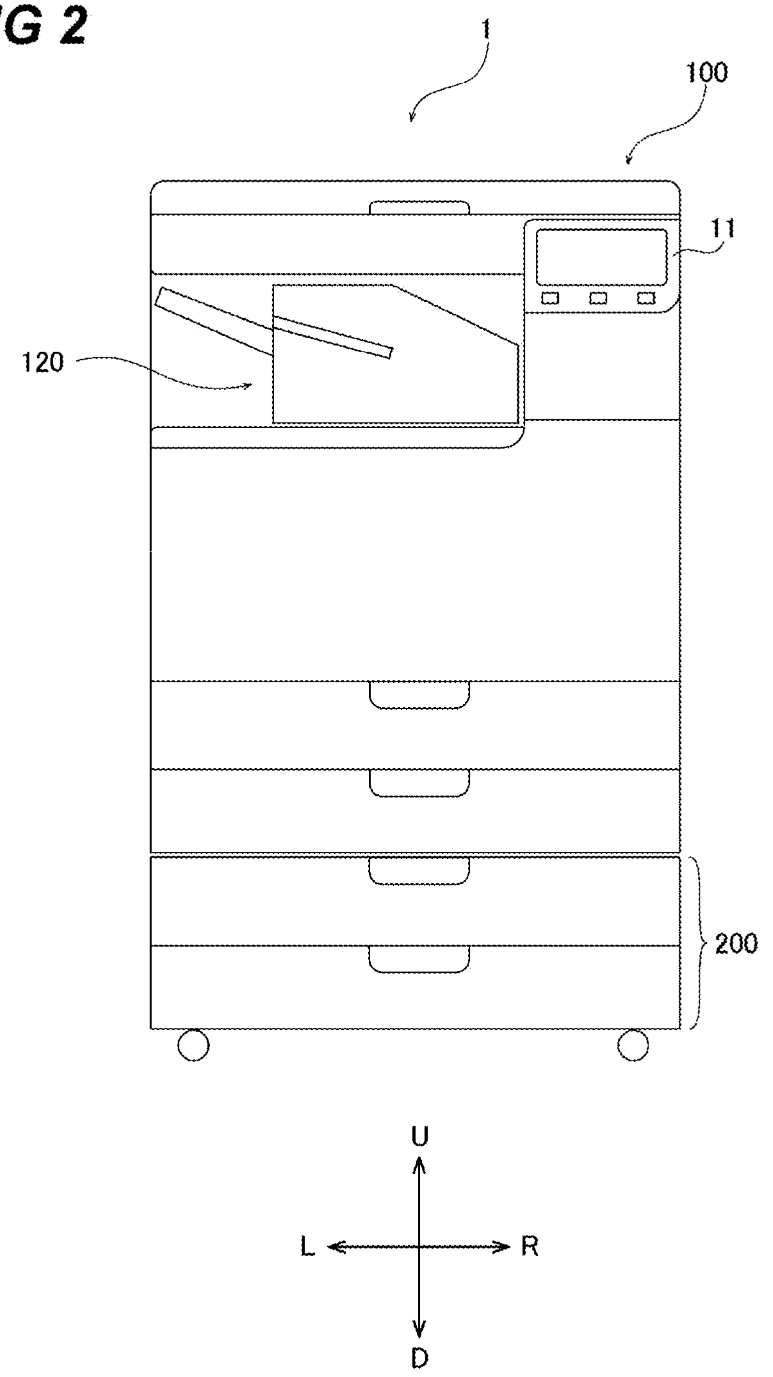
FIG. 2 is a diagram showing a front view of the image forming apparatus and a processing unit.
Figure 3:
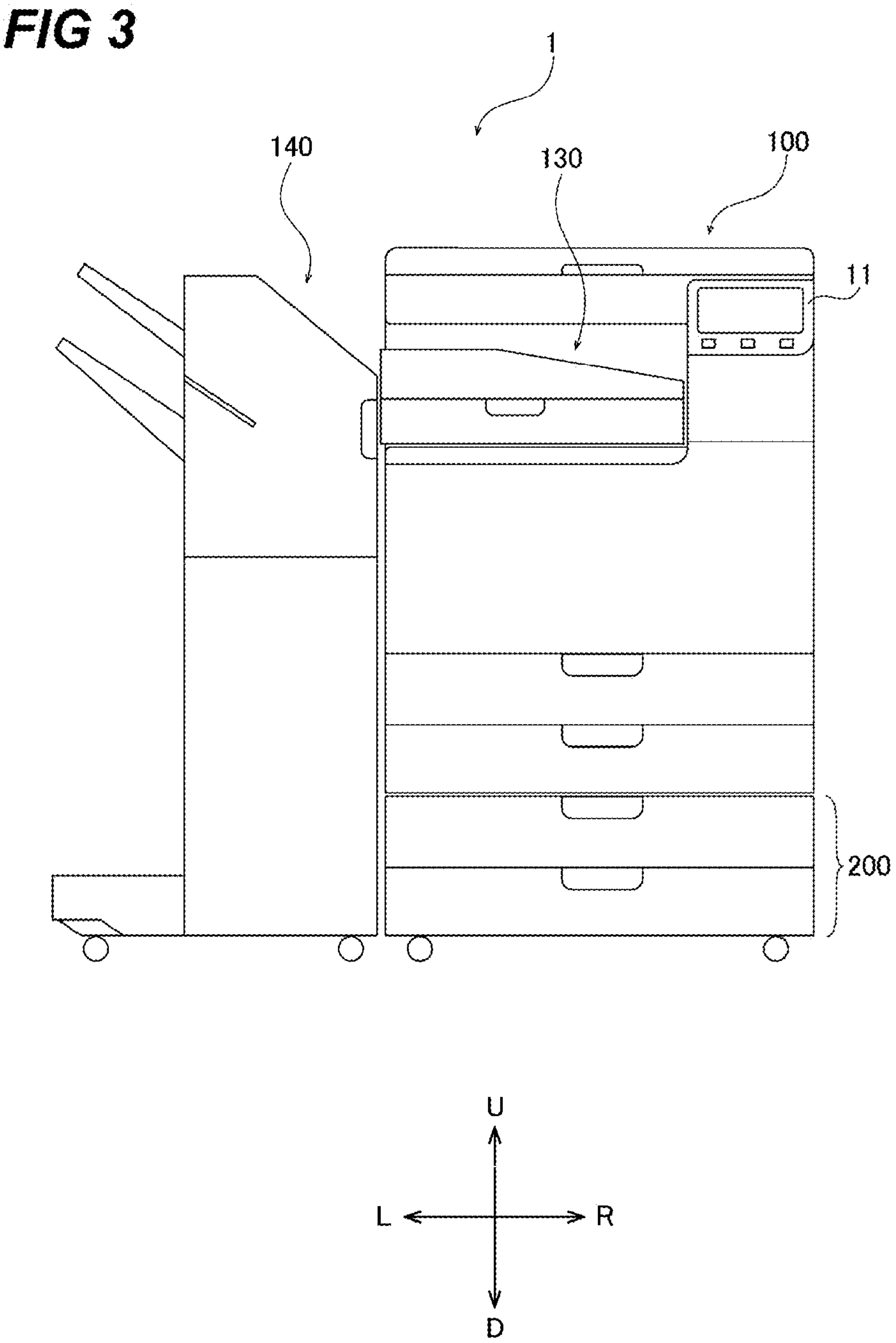
FIG. 3 is a diagram showing a front view of the image forming apparatus and the processing unit.

FIG. 2 is a diagram showing an example of the image forming apparatus 1 with the inner finisher 120 installed on the inside space on the inside lower cover 30. FIG. 3 is a diagram showing an example of the image forming apparatus 1 with the saddle finisher 140 installed on the side surface.

As shown in FIG. 2, the cassette pedestal 200 that is an optional unit for increasing sheet feeding ports is connected to the bottom surface of the image forming apparatus 1. Further, the inner finisher 120 is connected in the inside space on the inside lower cover 30.

As understood from FIG. 2, despite of the additional installation of the inner finisher 120, the installation area necessary for image forming apparatus 1 does not increase, so that processing functions can be added with space saving.

As shown in FIG. 3, the cassette pedestal 200 is connected to the bottom surface of the image forming apparatus 1 and the saddle finisher 140 is disposed on the left side surface of the image forming apparatus 1. Because of this, the distance between the discharge roller pair 20 that discharges the sheet and the saddle finisher 140 becomes longer by the width of the inside space. To deal with this, the buffer path unit 130 as a conveying unit that relays and coveys the sheet from the discharge roller pair 20 to the saddle finisher 140 that is another unit, is disposed in the inside space.

As described above, the buffer path unit 130 is one of the processing units, like the inner finisher 120.

(Configuration for Connecting Processing Unit)

By the way, in the processing unit such as the inner finisher 120 and the buffer path unit 130, sheet conveyance and various processes are controlled by control signals from the image forming apparatus side. Therefore, in a processing unit, an electrical connection portion is necessary for transmitting control signals from the apparatus main body of the image forming apparatus.

In many processing units to be connected to an image forming apparatus, a cable with a connector on the tip of the cable is disposed at a position where a user can access and visibly recognize the cable easily. The processing unit is electrically connected to the apparatus main body by performing the two steps of: securing the processing unit to the image forming apparatus, and manually connecting a connector on the processing unit side to a connector on the image forming apparatus side.

In contrast, in the present embodiment, the electrical connection for transmitting control signals from the apparatus main body is performed by a drawer connector (not shown in FIG. 2) in order to simplify the installation procedure of the processing unit and to shorten the installation time.

Figure 4:
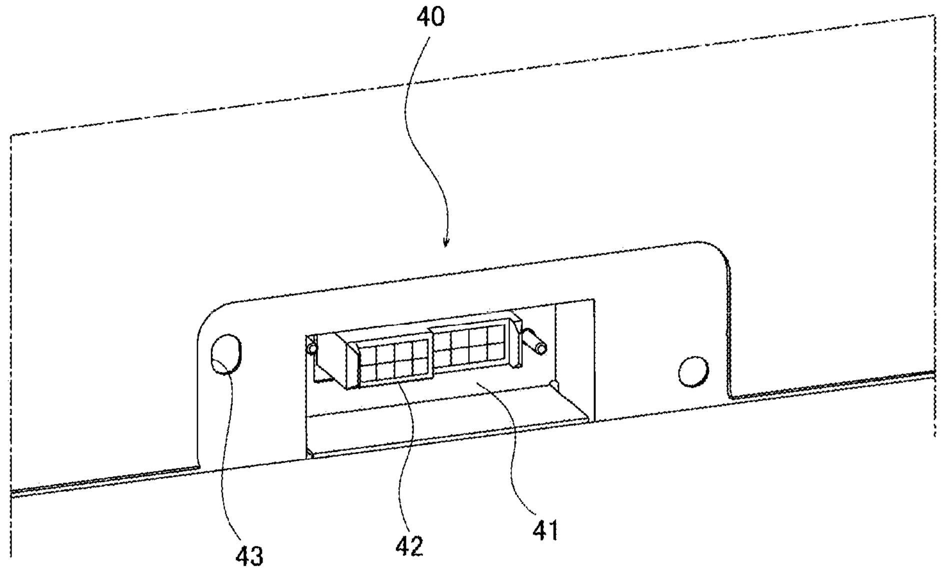
FIG. 4 is a diagram showing a partially enlarged perspective view of the image forming apparatus.
Figure 5A:
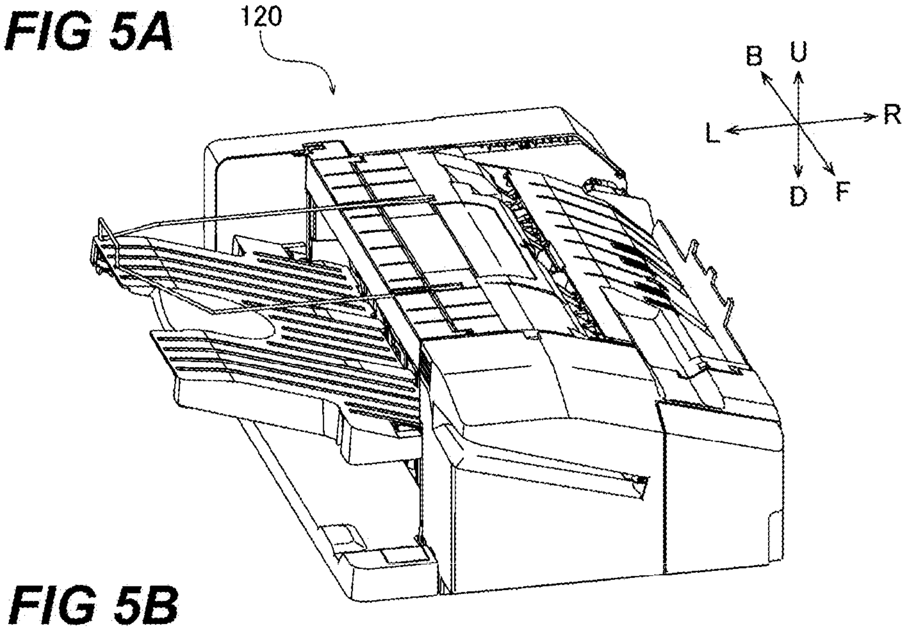
FIGS. 5A and 5B are diagrams showing a perspective view of the processing unit.
Figure 5B:
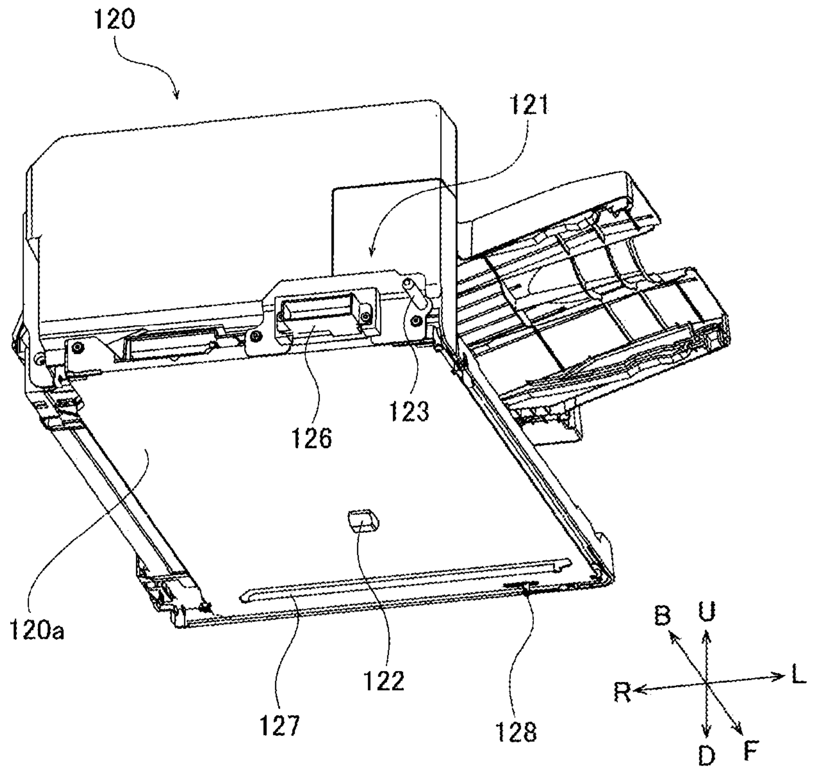
Figure 6:
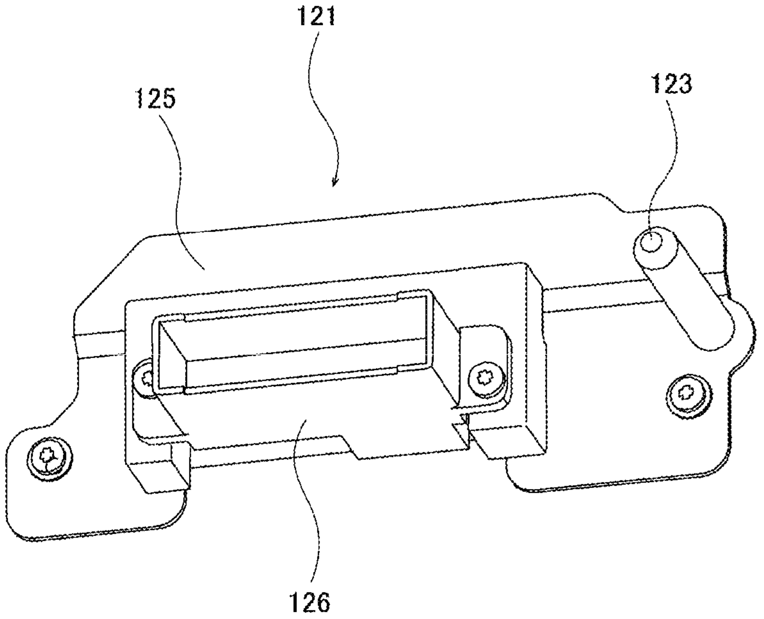
FIG. 6 is a diagram showing a partially enlarged perspective view of the processing unit.

Next, the disposition of the drawer connector will be described referring to FIGS. 1, 4, 5 and 6. FIG. 4 is a diagram showing an enlarged perspective view of the main body connection portion 40 on the image forming apparatus side. FIGS. 5A and 5B are diagrams showing a perspective view of the inner finisher 120 alone. FIG. 5A is a diagram showing a perspective view of the inner finisher 120 viewed from above on the front side. FIG. 5B is a diagram showing a perspective view of the inner finisher 120 viewed from below on the back side. FIG. 6 is a diagram showing an enlarged perspective view of the unit connection portion 121 of the inner finisher 120.

The drawer connector consists of a pair of a male connector and a female connector. Namely, the drawer connector consists of the drawer connector 126 (first connector) of the unit connection portion 121 on the inner finisher 120 side and the drawer connector 42 (second connector) of the main body connection portion 40 on the image forming apparatus 1 side.

Figure 7:
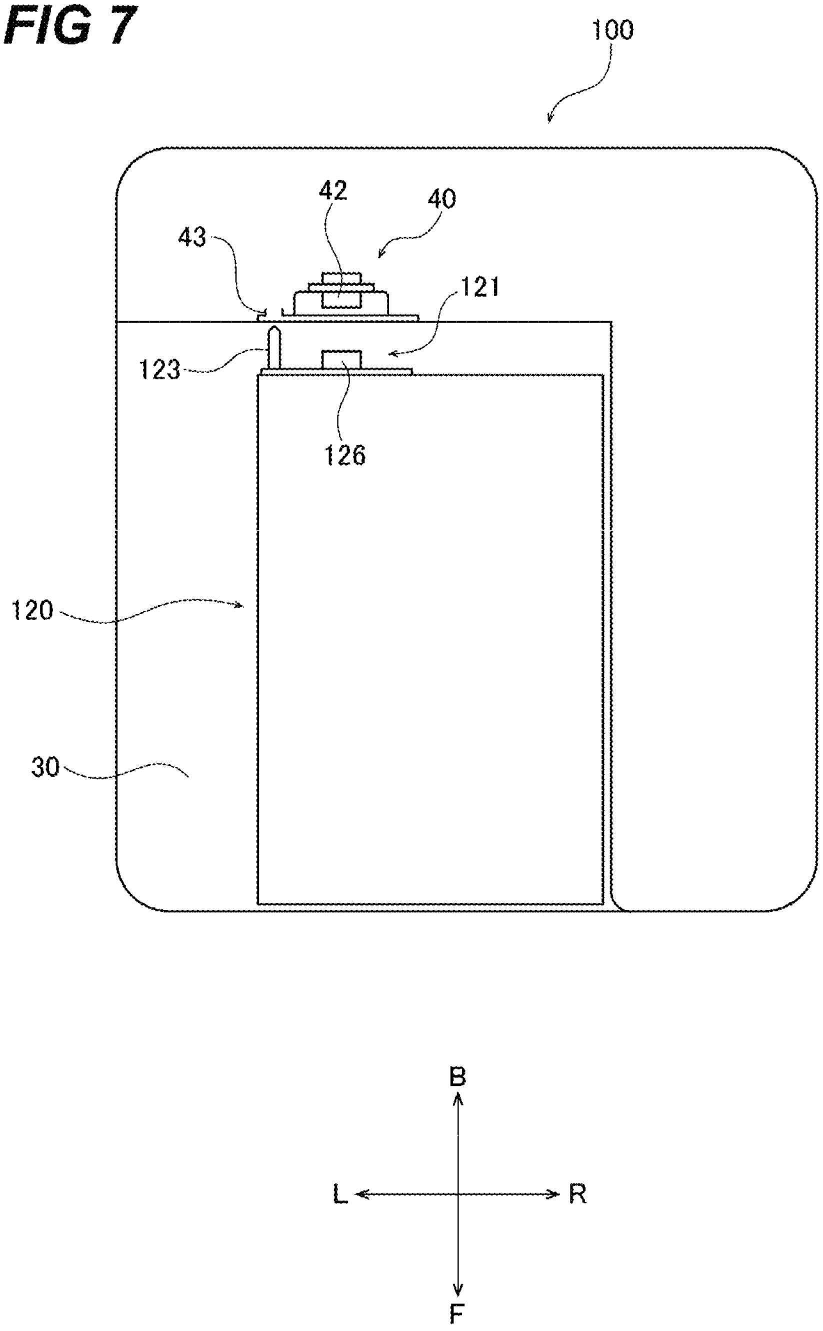
FIG. 7 is a diagram showing a cross-sectional view of the image forming apparatus and the processing unit.

As shown in FIGS. 1 and 4, the main body connection portion 40 on the image forming apparatus 1 side is located on the substantially central portion on the connector installation surface on the back side in the forward/backward directions in the inside space. As shown in FIG. 7, the main body connection portion 40 is disposed further back in the forward/backward directions (second directions) with respect to the inside lower cover 30. In another point of view, the main body connection portion 40 is disposed at one side (first side) in the directions (second directions) crossing the sheet discharge direction with respect to the position (sheet discharge position) of the sheet discharged from the discharge portion (discharge roller pair 20). The drawer connector 42 (second connector, main body side connector) on the image forming apparatus 1 side is disposed on a substantially central portion of the drawer holding plate 41 (of the main body connection portion 40) that forms a surface on back side in forward/backward directions in the inside space.

As shown in FIG. 5B, the unit connection portion 121 on the inner finisher 120 side is provided on the tip side with respect to the insertion into the backward direction B in the forward/backward directions. The drawer connector 126 (first connector, processing unit side connector) on the inner finisher 120 side is disposed at the center of the unit drawer holding plate 125 in the unit connection portion 121. When the inner finisher 120 is installed, the drawer connector 126 on the inner finisher 120 side is inserted into the drawer connector 42 on the image forming apparatus 1 side along the direction (second direction) crossing the sheet discharging direction. In this way, the drawer connector 126 on the inner finisher 120 side and the drawer connector 42 on the image forming apparatus 1 side are engaged with each other, so that the inner finisher 120 and the apparatus main body 100 are electrically connected to each other.

The drawer connector 42 on the apparatus main body 100 side is provided with the square-tube-shaped housing. Inside the square-tube-shaped housing, the terminal group for electrically connecting the inner finisher 120 is disposed.

Similarly, the drawer connector 126 on the unit side is provided with the square-tube-shaped housing and inside the square-tube-shaped housing, the terminal group for electrically connecting the apparatus main body 100 is disposed.

With the above described configuration, when the inner finisher 120 is attached in the inside space of the image forming apparatus 1, the drawer connector 126 is located at the tip side in the unit inserting direction, so that the drawer connector 126 is easily fit into the drawer connector 42 on the main body side only by the procedures of the unit attaching operation, which enables easy electrical connection.

In the above, although the connection of the drawer connector on the processing unit side has been described exemplifying the case where the processing unit is the inner finisher 120, similar is the case where the processing unit is the buffer path unit 130. Namely, the configuration and the arrangement of the unit connection portion of the buffer path unit 130 are equivalent to those of the inner finisher 120. The unit connection portion 121 can be commonly used in the buffer path unit 130 and the inner finisher 120.

(Positioning Configuration of Processing Unit/Left and Right Directions)

Next, the positioning configuration of the processing unit with respect to the image forming apparatus 1 in the left and right directions will be described.

As shown in FIGS. 5B and 6, the inner finisher 120 is provided with the positioning shaft 123 as a second positioning portion that is positioned by being engaged with the apparatus main body 100 of the image forming apparatus 1. The positioning shaft 123 is disposed at a tip portion in the insertion of the inner finisher 120 in the backward direction B in the forward and backward directions. The positioning shaft 123 is disposed in the vicinity of the drawer connector 126 in the unit connection portion 121.

As shown in FIG. 4, the apparatus main body 100 of the image forming apparatus 1 is provided with the positioning hole 43 as an engaging hole that engages with the positioning shaft 123. The positioning hole 43 is disposed, in the apparatus main body 100, on the backside surface of the inside space in the forward and backward directions. The positioning hole 43 is disposed further back in the forward and backward directions than the inside lower cover 30.

The positioning shaft 123 of the unit connection portion 121 is disposed such that the positioning shaft 123 fits into the positioning hole 43 of the main body connection portion 40. As shown in FIG. 6, the positioning shaft 123 is a cylindrical shaft member that extends in the forward and backward directions beyond the drawer connector 126. The length of the positioning shaft 123 in the forward and backward directions is adjusted such that the positioning shaft 123 engages with the positioning hole 43 before the drawer connector 126 on the inner finisher 120 side engages with the drawer connector 42 on the apparatus main body 100 side. When the inner finisher 120 is installed, the inner finisher 120 is first in the state (1) in which the positioning shaft 123 is separated from the positioning hole 43 and the drawer connector 126 on the inner finisher 120 side is separated from the drawer connector 42 on the apparatus main body 100 side. As the inner finisher 120 relatively moves with respect to the apparatus main body 100, the inner finisher 120 shifts from the state (1) to the state (2) in which the positioning shaft 123 passes through the positioning hole 43 and the drawer connector 126 on the inner finisher 120 side is separated from the drawer connector 42 on the apparatus main body 100. Thereafter, the inner finisher 120 shifts from the state (2) to the state (3) in which the positioning shaft 123 passes through the positioning hole 43 and the drawer connector 126 on the inner finisher 120 side is connected to the drawer connector 42 on the apparatus main body 100.

In this way, the positioning shaft 123 on the processing unit side fits into the positioning hole 43 on the apparatus main body side first, so that the drawer connector 126 on the processing unit side and the drawer connector 42 on the machine body side are positioned opposed to each other, and the connector pairs are fit without riding over.

The fitting of the positioning shaft 123 on the processing unit side into the positioning hole 43 on the apparatus main body side, and the fitting of the drawer connector 126 into the drawer connector 42 on the apparatus main body side will be described using FIGS. 7, 8 and 9, which are diagrams showing A-A cross-sectional view in FIG. 1 of the image forming apparatus and the processing unit.

FIG. 7 shows the state immediately before the positioning shaft 123 of the inner finisher 120 fits into the positioning hole 43 on the apparatus main body side. FIG. 8 shows the state in which the drawer connector 126 on the processing unit side is fit into the drawer connector 42 on the apparatus main body side after the positioning shaft 123 of the inner finisher 120 fits into the positioning hole 43 on the apparatus main body side.

Figure 8:
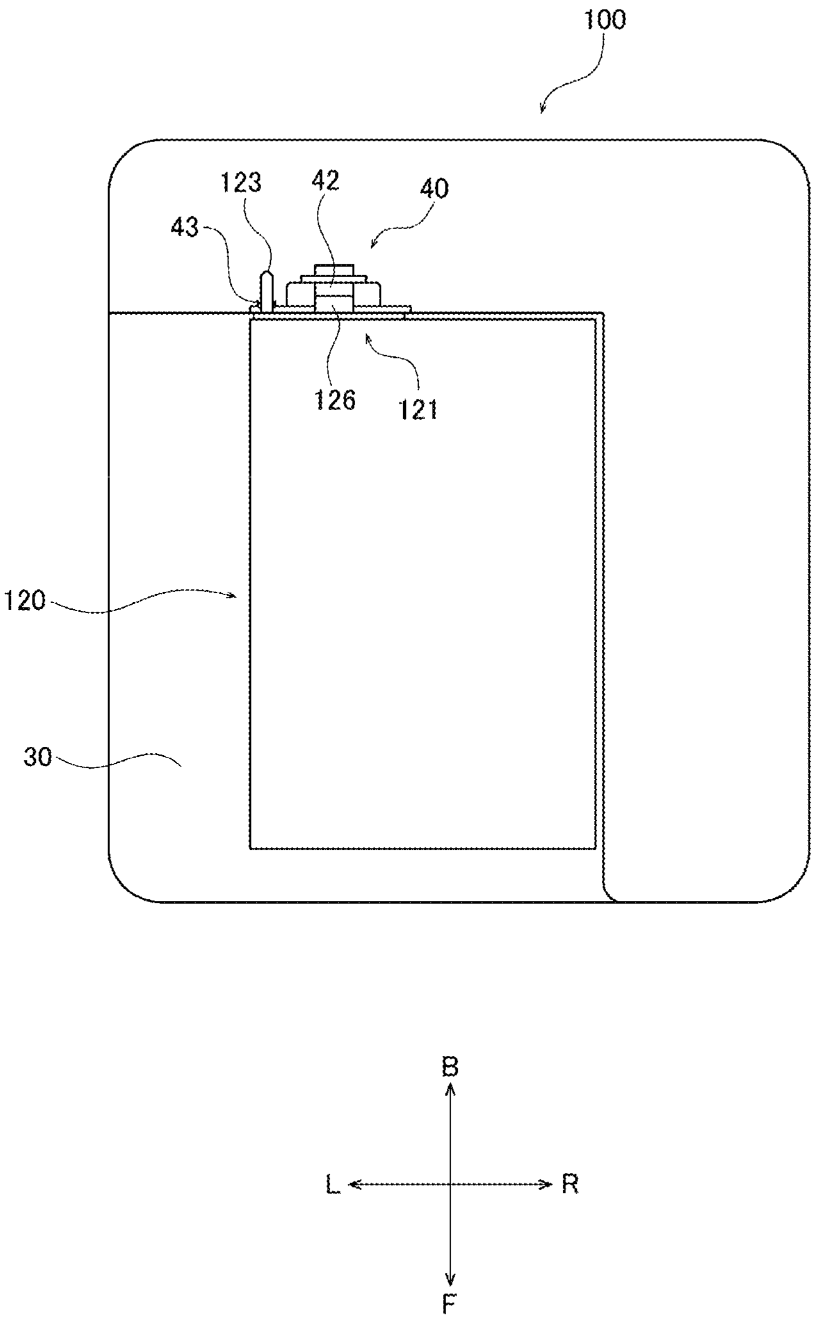
FIG. 8 is a diagram showing a cross-sectional view of the image forming apparatus and the processing unit.

It is understood from FIGS. 7 and 8 that the fitting of the positioning shaft 123 on the processing unit side into the positioning hole 43 on the apparatus main body side is performed before the fitting of the drawer connector pair (42, 126) begins.

The above configuration reduces the risk that the connection of the connectors is not properly performed by the drawer connector pair (42, 126) riding over without fitting when the processing unit is installed.

Next, the configuration will be described that makes easier the connection of the connectors by being combined with or replaced by the configuration of fitting the positioning shaft 123 into the positioning hole 43.

Figure 9:
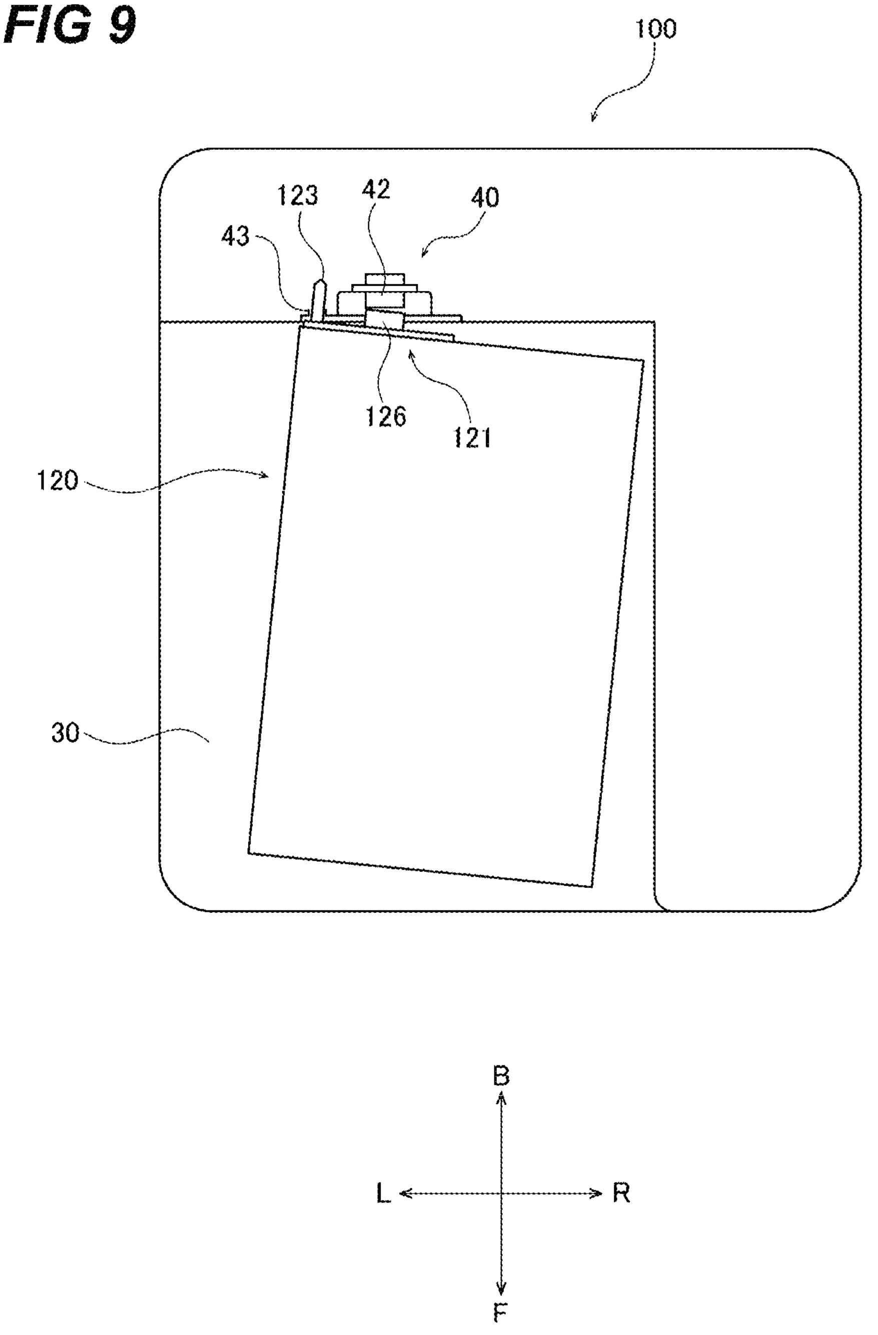
FIG. 9 is a diagram showing a cross-sectional view of the image forming apparatus and the processing unit.

As shown in FIG. 9 for example, even in the state where the positioning shaft 123 is fitted into the positioning hole 43, the front side of the inner finisher 120 may be tilted in the leftward direction with respect to the back side surface of the inside space of the apparatus main body 100.

This is due to the outer diameter of the positioning shaft 123 has a predetermined clearance for the inner diameter of the positioning hole 43.

With this predetermined clearance, the positioning shaft 123 on the processing unit side smoothly slides on the positioning hole 43 on the apparatus main body side 100 in the backward direction in the forward and backward directions while the positioning shaft 123 fits into the positioning hole 43. On the other hand, when the positioning shaft 123 is tilted with respect to the positioning hole 43 within this predetermined clearance, this leads to the state shown in FIG. 9.

In this case, as understood from FIG. 9, one of the pair of the drawer connectors 42 and 126 may be tilted to the other, in the leftward or rightward directions, so that the drawer connector pair (42, 126) may not fit to each other properly.

In contrast, in the present embodiment, the configuration of the positioning in the leftward and rightward directions is added other than the positioning shaft 123 in order to make the connection of the drawer connector pair (42, 126) easier. In the following, the configuration of the positioning in the leftward and rightward directions is described as an additional configuration, however, it is possible to adopt this configuration of the positioning in the leftward and rightward directions without implementing the fitting configuration using the positioning shaft 123 and the positioning hole 43.

Figure 12:
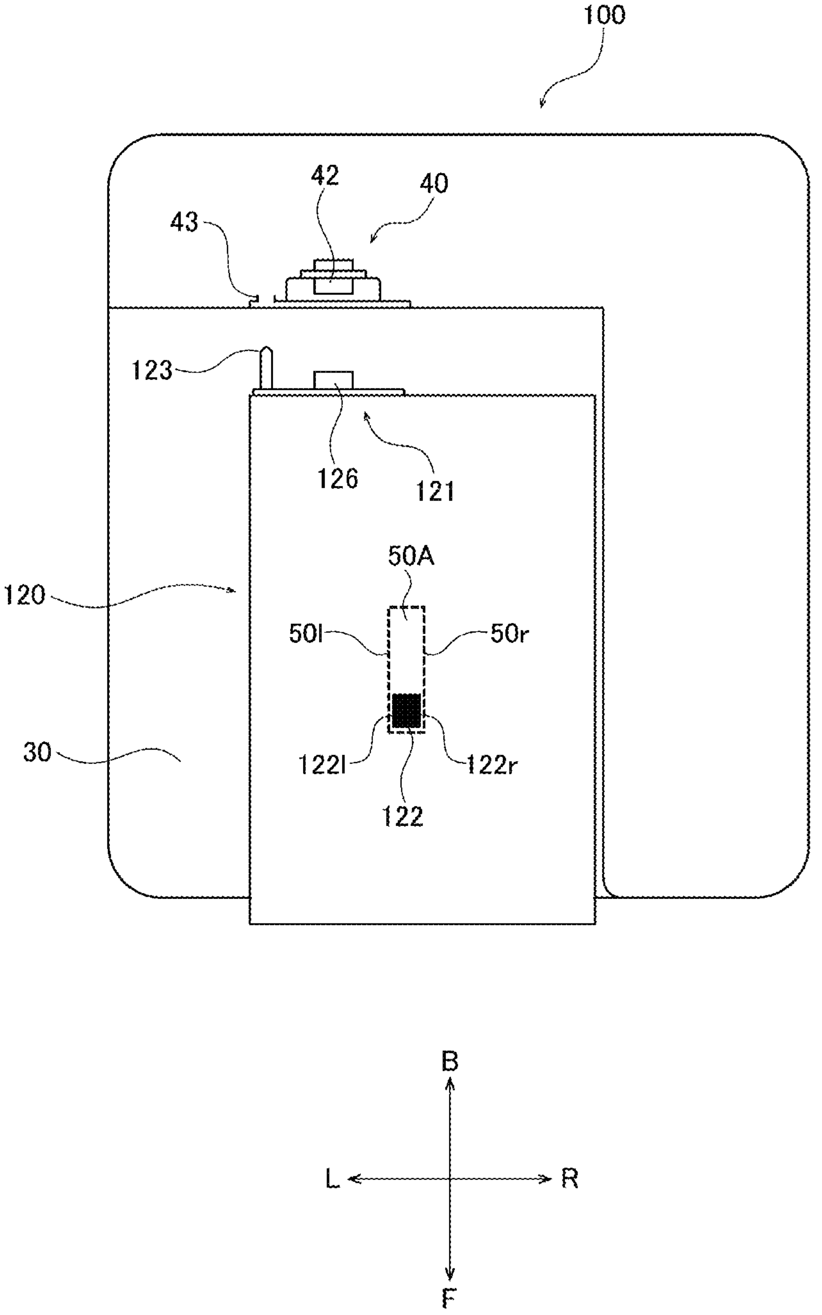
FIG. 12 is a diagram showing a cross-sectional view of the image forming apparatus and the processing unit.
Figure 13:
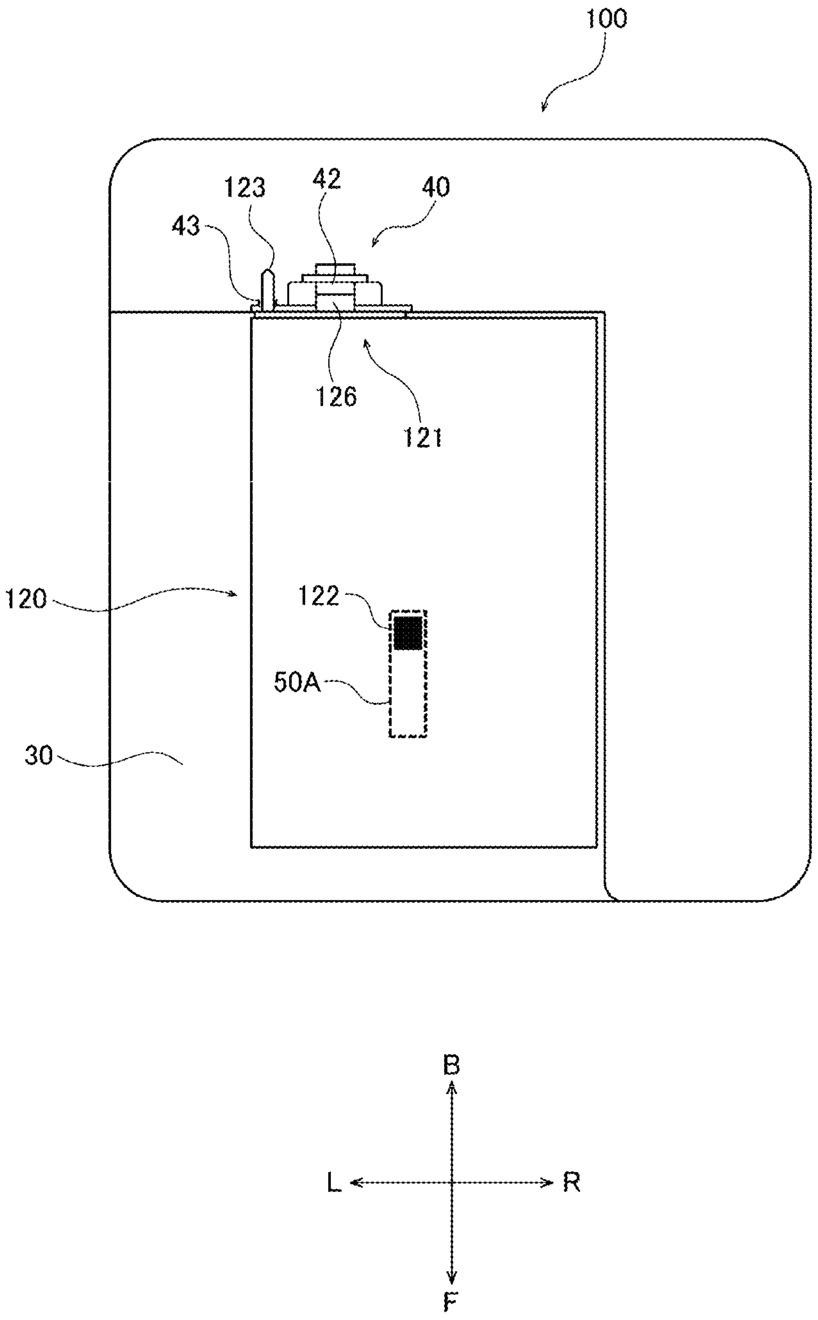
FIG. 13 is a diagram showing a cross-sectional view of the image forming apparatus and the processing unit.

In the following, the positioning configuration in the leftward and rightward directions will be described referring to FIGS. 5, 10 to 13. FIG. 10 is a diagram showing a perspective view of the inside space of the image forming apparatus 1. FIG. 11 is a diagram showing a partial enlarged perspective view of the image forming apparatus, specifically a partial enlarged perspective view of the inside lower cover 30. FIGS. 12 and 13 are diagrams showing an A-A cross-sectional view shown in FIG. 1 of the image forming apparatus and the processing unit.

As shown in FIG. 5B, the inner finisher 120 as a processing unit is provided with the protrusion 122 as a first positioning portion (protruding portion). The protrusion 122 engages with the apparatus main body 100 of the image forming apparatus 1 such that the protrusion 122 is movable in the forward and backward directions (second directions) and its movement in the leftward and rightward directions (first directions) is restricted. The protrusion 122 is provided on the bottom surface 120*a* of the inner finisher 120 such that the protrusion 122 protrudes from the bottom surface 120*a* in the downward direction. Namely, the protrusion 122 is provided such that the protrusion 122 protrudes from the bottom surface 120*a* of the inner finisher 120 toward the inside lower cover 30.

Figure 10:
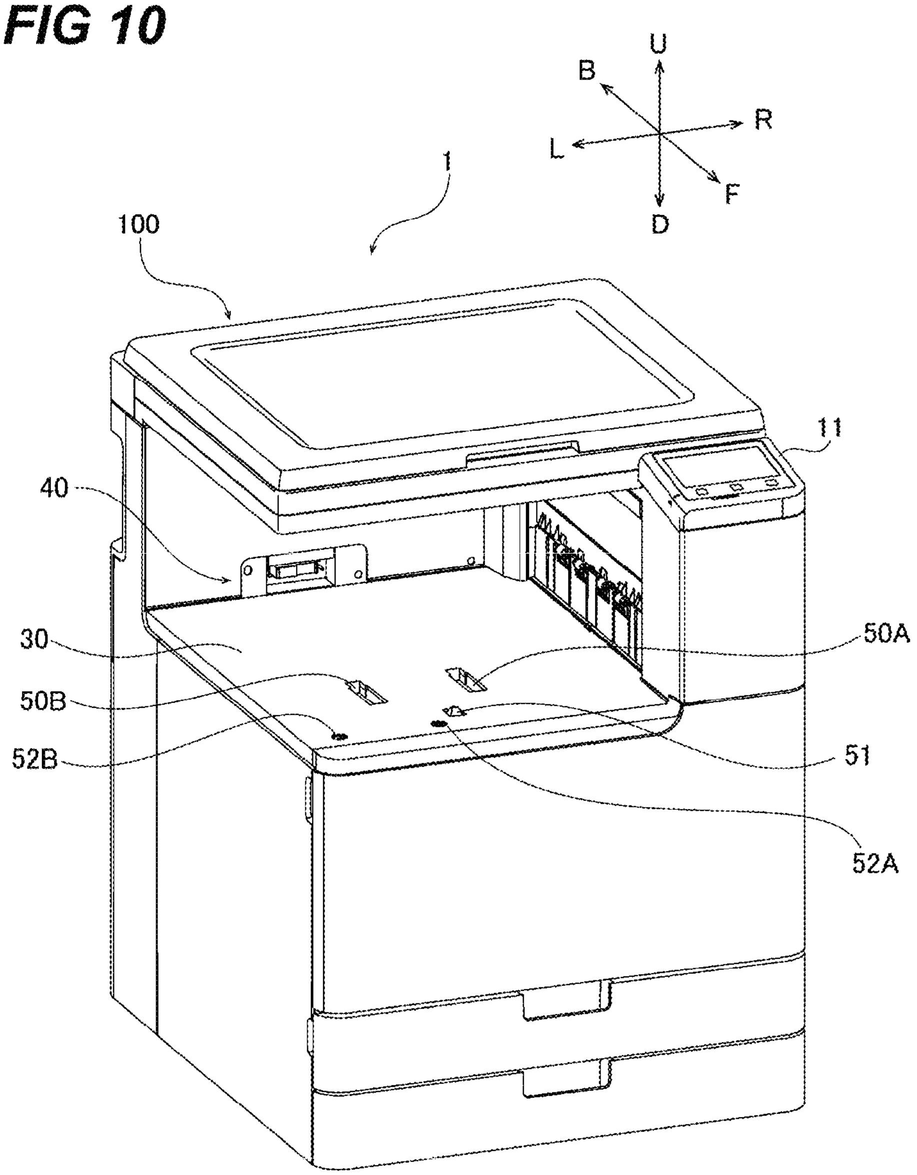
FIG. 10 is a diagram showing a perspective view of the image forming apparatus.
Figure 11:
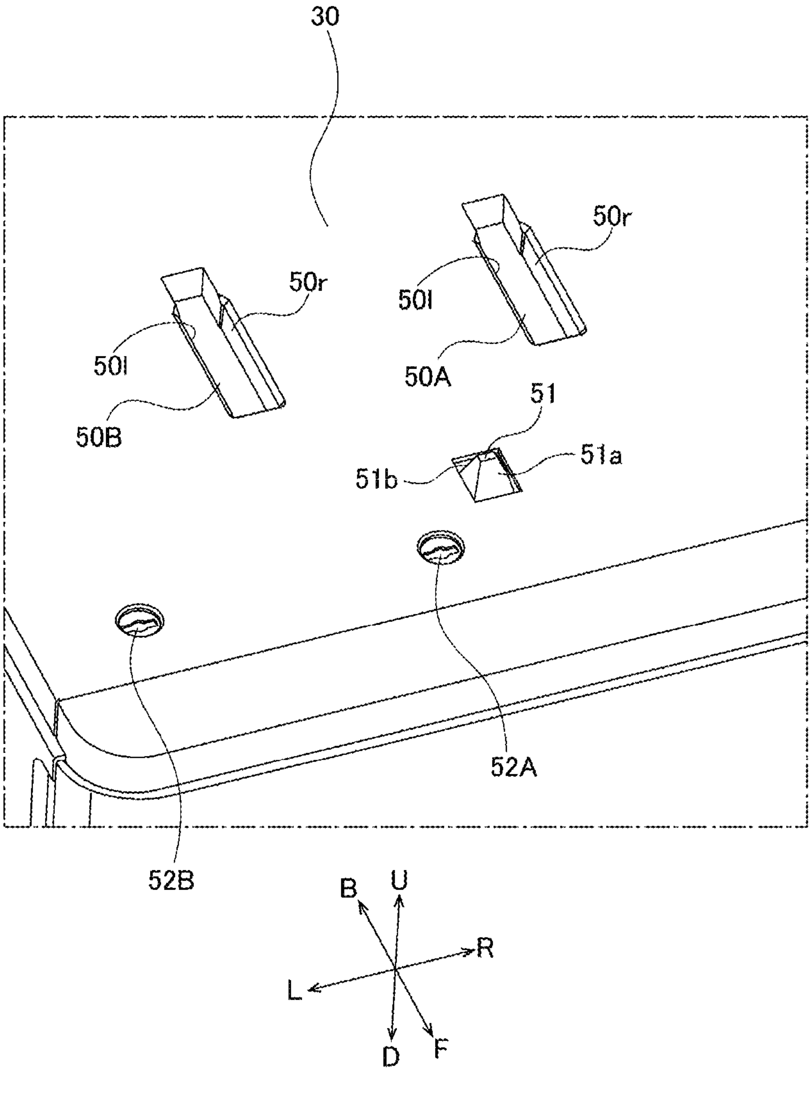
FIG. 11 is a diagram showing a partially enlarged perspective view of the image forming apparatus.

On the other hand, as shown in FIGS. 10 and 11, the apparatus main body 100 of the image forming apparatus 1 is provided with the grooves 50A and 50B as groove portions. Each of the grooves 50A and 50B can engage with the protrusion 122 to allow the protrusion 122 to move in the forward and backward directions (second directions). Further, each of the grooves 50A and 50B restricts the movement of the engaged protrusion 122 in the leftward and rightward directions (first directions). The grooves 50A and 50B are provided on the inside lower cover 30. The grooves 50A and 50B are formed as a concaved shape in the upward and downward directions (third directions) on the inside lower cover 30.

When the protrusion 122 engages with any one of the groove 50A and groove 50B, the movable range of the inner finisher 120 in the leftward and rightward directions (first directions) and the movable range of the inner finisher 120 in the forward and backward directions (second directions) with respect to the apparatus main body 100 are defined. The movable range in the first directions and the movable range in the second directions are determined by the sizes of the corresponding directions of the protrusion 122, the groove 50A and the groove 50B. By restricting the movable range in the leftward and rightward directions (first directions), the drawer connector 126 on the inner finisher 120 side is guided to the position where the drawer connector 126 on the inner finisher 120 side fits to the drawer connector 42 on the apparatus main body 100 side. As a result, even if the drawer connector pair (42, 126) is not recognized by sight, the connection of the drawer connector pair (42, 126) can be easily performed.

When the inner finisher 120 is installed on the apparatus main body 100, the protrusion 122 of the inner finisher 120 fits into any one of the groove 50A and the groove 50B. At this state, the drawer connector 126 on the inner finisher 120 side is separated from the drawer connector 42 on the apparatus main body 100 side. Further, when the positioning shaft 123 and the positioning hole 43 are provided, the positioning shaft 123 is separated from the positioning hole 43. In this state, the inner finisher 120 is relatively movable in the directions (second directions) crossing the sheet discharging direction with respect to the apparatus main body 100. On the other hand, the movable range of the inner finisher 120 in the sheet discharging direction (first direction) is restricted to be narrower than the movable range in the second directions.

The movable range in the direction (second direction) crossing the sheet discharging direction is determined such that at least the state where the drawer connector 126 on the inner finisher 120 side and the drawer connector 42 on the apparatus main body 100 side are separated from each other and the state where the drawer connector 126 on the inner finisher 120 side and the drawer connector 42 on the apparatus main body 100 side fit with each other are present. One end (back side) of the movable range in the second direction can be substantially determined by the drawer connector pair (42, 126) in the fitting state. The other end (front side) of the movable range in the second direction can be substantially determined by end portions of the groove 50A (or the groove 50B). Or as an alternative, the apparatus can be configured such that the front side of the groove 50A (or the groove 50B) is open and the front side of the movable range in the second direction is located in the position where the inner finisher 120 is substantially separated from the apparatus main body 100.

Next, the movable range in the rightward and leftward directions (first directions) will be described. It is sufficient that the movable range in the leftward and rightward directions include at least the position where the connectors of the drawer connector pair (42, 126) fit with each other. The apparatus can be configured such that when the protrusion 122 is fitted in the groove 50A (or the groove 50B), the inner finisher 120 does not at all move in the leftward and rightward directions with respect to the apparatus main body 100. In this configuration, the protrusion 122 may not fit into the groove 50A (or the groove 50B) due to production variations. Thus, taking production variations into consideration, the width of the groove 50A (or the groove 50B) in the first direction may be greater than the width of the protrusion 122 in the first direction.

The grooves 50A and 50B extend in the forward and the backward directions of the image forming apparatus and the widths of front side of the grooves in the leftward and rightward directions may be greater than the ones of the back side of the grooves. With this configuration, the protrusion 122 of the inner finisher 120 engages with the groove 50A (or the groove 50B) more easily on the front side than on the back side, leading to the improvement of operability. In the viewpoint of operability, the greater the width of the grooves in the leftward and rightward directions becomes, the better it gets. Further, when the inner finisher 120 is installed, it is preferable that the movable range in the leftward and rightward directions (first directions) is narrower than the movable range in the forward and backward directions (second directions) immediately before the fitting of the drawer connection pair (42, 126). Therefore, in order to improve the operability for example, the movable range in the leftward and rightward directions (first directions) may be greater than the movable range in the forward and backward directions (second directions) in a partial state.

As shown in FIG. 11, the groove 50A extends along the forward and the backward directions (second directions) and has the left wall surface (first wall surface) 501 and the right wall surface (second wall surface) 50*r*, which are opposed to each other in the leftward and rightward directions (first directions). Similarly, the groove 50B extends along the forward and the backward directions (second directions) and has the left wall surface (first wall surface) 501 and the right wall surface (second wall surface) 50*r*, which are opposed to each other in the leftward and rightward directions (first directions).

On the other hand, as shown in FIG. 12, the protrusion 122 has the left side surface (first side surface) 1221 and the right side surface (second side surface) 122*r*, which are opposed to each other in the leftward and rightward directions (first directions). When the protrusion 122 is fitted in the groove 50A (or the groove 50B), the left side surface (first side surface) 1221 is opposed to the left wall surface 501 of the groove 50A (or the groove 50B). When the protrusion 122 is fitted in the groove 50A (or the groove 50B), the right side surface (second side surface) 122*r* is opposed to the right wall surface 50*r* of the groove 50A (or the groove 50B).

By the protrusion 122, the groove 50A, and the groove 50B being configured as described above, the inner finisher 120 is restricted in a certain level from being rotated around the protrusion 122 on the inside lower cover 30 of the image forming apparatus 1.

As shown in FIG. 12, the image forming apparatus 1 has the positional relationship in which the protrusion 122 on the bottom surface 120*a* of the inner finisher 120 fits into the front side of the groove 50A shown in a broken line before the positioning shaft 123 of the inner finisher 120 engages with the positioning hole 43 of the apparatus main body 100 side. In this case, the width of the front side of the groove 50A in the leftward and rightward directions is slightly greater than the width of the protrusion 122 in the leftward and rightward directions, so that the protrusion 122 can engage easily with the groove 50A. Although the inner finisher 120 may shift in the leftward and rightward directions, this shift is extremely small for the inclination of the inner finisher 120 and is sufficiently neglectable.

When the inner finisher 120 is pushed toward the back side of the inside space from the state shown in FIG. 12, the positioning shaft 123 fits into the positioning hole 43 and then the drawer connector 126 fits with the drawer connector 42 as shown in FIG. 13. In this case, the protrusion 122 is fitted in the most back part of the groove 50A and there is almost no room for a positional shift in the leftward and rightward directions.

In the state where the protrusion 122 is fitted in the most back part of the groove 50A and the positioning shaft 123 is fitted in the positioning hole 43 as shown in FIG. 13, the inner finisher 120 cannot be tilted in the leftward and rightward directions as shown in FIG. 9. Therefore, the drawer connector 126 on the processing unit side and the drawer connector 42 on the apparatus main body 100 side can easily fit with each other, the electrical connection between the unit and the apparatus main body 100 can be ensured, and the risk of a connection failure of the drawer connectors and breakage of the drawer connectors can be reduced.

Further, the buffer path unit 130 has also the configuration including the unit connection portion 121 and the protrusion 122 similar to the inner finisher 120. Therefore, by the protrusion 122 on the bottom surface of the buffer path unit 130 fitting into the groove 50A on the apparatus main body

100 side, the movement in the leftward and rightward directions is restricted and the same effect can be obtained.

(Positioning Configuration of Processing Unit/Forward and Backward Directions)

In addition to the configuration of positioning the processing unit to the image forming apparatus 1 in the leftward and rightward directions as described above, the configuration of positioning the processing unit in the forward and backward directions (insertion direction) is provided.

Figure 14:
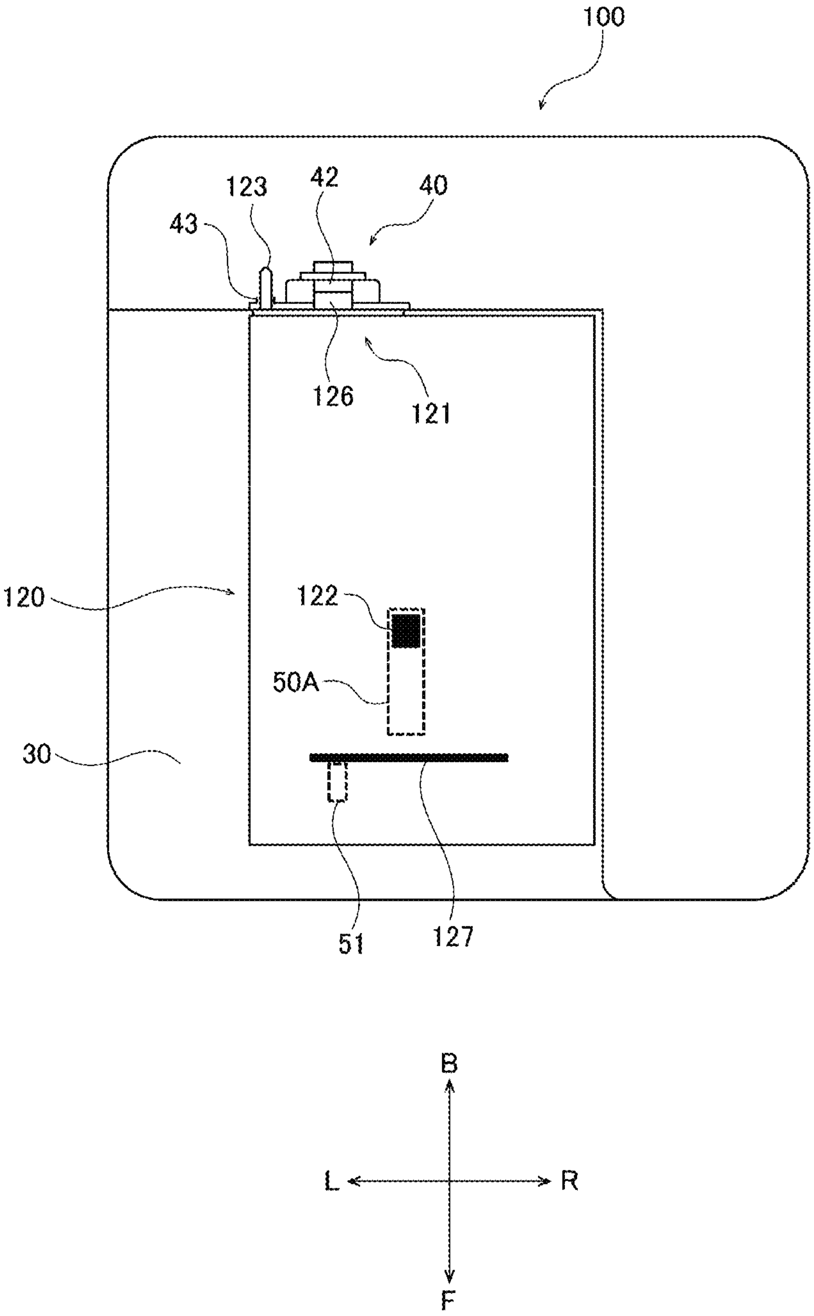
FIG. 14 is a diagram showing a cross-sectional view of the image forming apparatus and the processing unit.
Figure 15A:
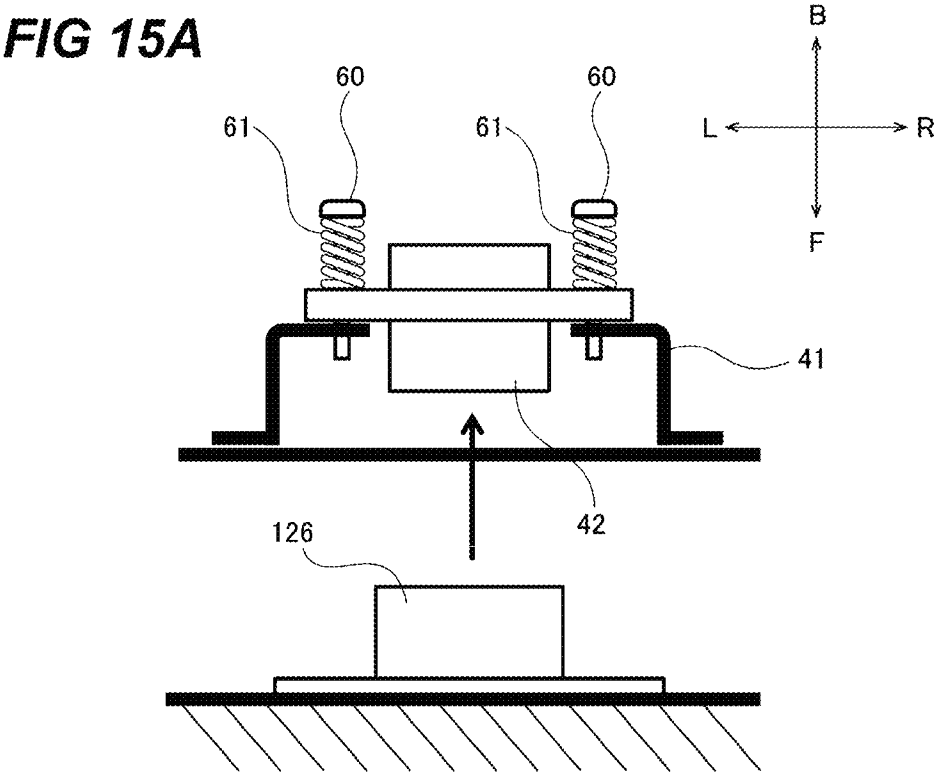
FIGS. 15A and 15B are diagrams showing an enlarged cross-sectional view of the connector portion of the image forming apparatus and the processing unit.
Figure 15B:
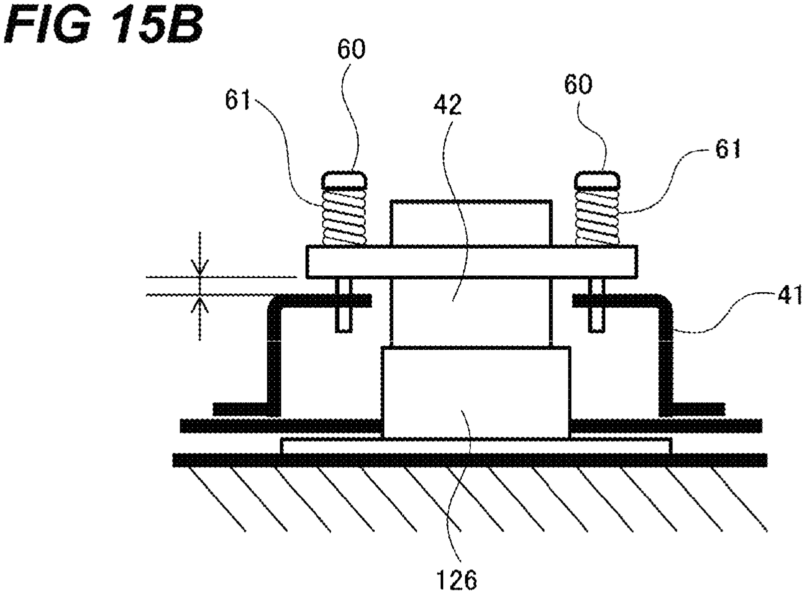

In the following, the configuration of positioning the processing unit with respect to the image forming apparatus 1 in the forward and backward directions will be described referring to FIGS. 5, 11, 14 and 15. FIG. 14 is a diagram showing a cross-sectional view of the image forming apparatus and the processing unit. FIGS. 15A and 15B are diagrams showing an enlarged A-A cross-sectional view shown in FIG. 1 of the connector portion of the image forming apparatus and the processing unit.

As shown in FIG. 11, the apparatus main body 100 of the image forming apparatus 1 is provided with the lever 51 as a movement restricting portion that restricts the movement of the inner finisher 120 in the direction (backward direction) opposite to the inserting direction (forward direction) of the inner finisher 120 out of the forward and backward directions (second directions). The lever 51 is provide on the front side on the inside lower cover 30 such that the lever 51 is capable of protruding in the upward direction toward the inner finisher 120 from the inside lower cover 30. The lever 51 is an engaging portion that protrudes from the top surface of the inside lower cover 30 and is to engage with the inner finisher 120.

Further, the lever 51 can be retracted inwards from the top surface of the inside lower cover 30 and is elastically urged by a spring (not shown) toward the inside space. With this configuration, the lever 51 can take two postures of the one in which the lever 51 is protruded in the inside space and the other in which the lever 51 is retracted. The lever 51 is normally in the state where the lever 51 is protruded in the inside space. As shown in FIG. 11, in the forward and backward directions, the lever 51 has the inclined surface 51*a* at the front side that is inclined to the downward direction when facing in the forward direction F and the vertical surface 51*b* at the back side.

On the other hand, as shown in FIG. 5B, the inner finisher 120 is provided with the engaging groove 127 that is to engage with the lever 51 on the apparatus main body 100 side. The engaging groove 127 is provided on the bottom surface 120*a* of the inner finisher 120 such that it extends in the leftward and rightward directions (first directions) and has the shape that is concave inwards of the inner finisher 120. The engaging groove 127 is disposed on the front portion of the bottom surface 120*a* and on the front side of the protrusion 122 in the forward and backward directions.

With the above configuration, the positioning of the inner finisher 120 in the forward and backward directions is performed by the engaging groove 127 on the processing unit side engaging with the vertical surface 51*b* on the back side of the lever 51 disposed on the inside lower cover 30.

In FIG. 14, the engaging groove 127 disposed on the bottom surface of the inner finisher 120 is shown in a transparent state, and the lever 51 is illustrated as a broken line.

As understood from the positional relationship shown in FIG. 14, the area of the vertical surface of the lever 51 that protrudes into the inside space engages with the engaging groove 127. As described above, by the vertical surface of the lever 51 engaging with the engaging groove 127, the movement of the inner finisher 120 in the forward direction is restricted to prevent the inner finisher 120 from being disengaged from the image forming apparatus 1.

The inner finisher 120 maintains the state of contact with the top surface of the inside lower cover 30 by its weight. Therefore, when the protruding length of the lever 51 into the inside space is a predetermined value (for example, about 5 mm), the engaging state can be sufficiently maintained.

When the inner finisher 120 is inserted into the inside space of the image forming apparatus 1, at first, the backend (end portion at the back side) of the inner finisher 120 engages with the inclined surface 51*a* of the lever 51 to push down the lever 51 in the downward direction, so that the lever 51 does not work as a load to the inserting operation. When the inner finisher 120 is inserted, the lever 51 is maintained to be pushed down below the bottom surface 120*a* of the inner finisher 120 until the vertical surface 51*b* engages with the engaging groove 127.

On the other hand, the detachment of the inner finisher 120 from the image forming apparatus 1 is performed by the retracting portion (not shown) of the lever 51 releasing the engagement of the lever 51 with the engaging groove 127 and by the inner finisher 120 being pulled out in the forward direction.

Next, the configuration of the drawer connector 42 disposed on the main body connection portion 40 will be described using FIGS. 15A and 15B.

The image forming apparatus 1 is provided with the pressing spring 61 as an urging member that urges the drawer connector 42 in the direction in which the drawer connector 42 engages with the drawer connector 126. The drawer connector 42 is urged in the forward direction of the apparatus main body 100 by the pressing spring 61 secured on the drawer holding plate 41 by the stepped screw 60. The pressing spring 61 is disposed in two positions such that the rib extending the rightward and leftward directions and the pressing spring 61 engage with each other. Namely, both sides of the drawer connector 42 in the right and left directions are urged by the pressing spring 61.

As understood from FIG. 15B, the drawer connector 42 is retractable with respect to the drawer holding plate 41 in the backward direction within the range t in which the pressing spring 61 can be compressed. As a result, even if the size of the inner finisher 120 in the backward direction has variations, these variations can be absorbed by the range t in which the drawer connector 42 is retractable, so that the inner finisher 120 can be pushed into the image forming apparatus 1. With this configuration, the position of the engaging groove 127 on the processing unit side doe not deviate from the position of the lever 51 on the apparatus main body 100 side, so that the fitting of the drawer connector pair (42, 126) is guaranteed.

At the same time, the inner finisher 120 is urged in the forward direction by the reactive force of the pressing spring 61, so that the contact of the vertical surface 51*b* of the lever 51 to the engaging groove 127 is guaranteed. Namely, lever 51 works as a receiving portion that receives an urging force of the pressing spring 61. With this configuration, shifts and variations in the position of the inner finisher 120 in the forward and backward directions can be reduced.

As describe above, by providing the configuration of positioning the inner finisher 120 in the forward and backward directions, the inner finisher 120 as a processing unit can be prevented from being disengaged in the forward direction and shifts and variations in the position of the inner finisher 120 can be reduced. Further, when the buffer path unit 130 is configured similar to the above described inner finisher 120, the buffer path unit 130 has the same effect.

(Positioning Configuration of Processing Unit/Upward and Downward Directions)

Figure 16A:
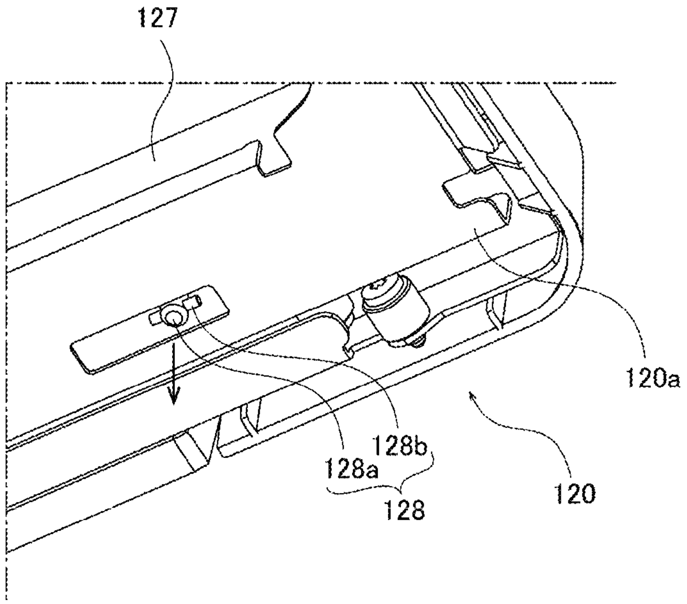
FIGS. 16A and 16B are diagrams showing a partial enlarged perspective view of the processing unit.
Figure 16B:
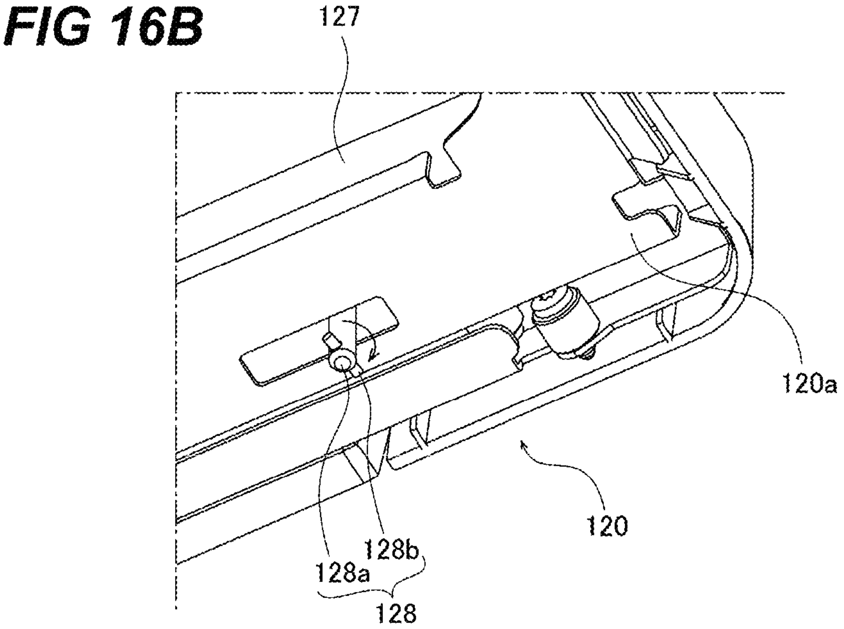

In the following, the configuration of positioning the processing unit with respect to the image forming apparatus 1 in the upward and downward directions will be described referring to FIGS. 5B, 10, 11, 16A and 16B. FIGS. 16A and 16B are diagrams showing a partial enlarged perspective view of the processing unit.

As described above, although the inner finisher 120 as a processing unit is kept on being placed on the inside lower cover 30 by its weight, it is preferable to be provided with an ensuring floating restricting portion. Accordingly, the positioning configuration in the upward and downward directions is further provided.

As shown in FIGS. 10 and 11, the image forming apparatus 1 is provided with the engaging holes 52A and 52B as a floating restricting portion that restricts the movement of the inner finisher 120 in the upward and downward directions (third directions). The engaging holes 52A and 52B are disposed on the inside lower cover 30 on the apparatus main body 100 side.

On the other hand, as shown in FIGS. 16A and 16B, the inner finisher 120 is provided with the positioning pin 128 to engage with the engaging hole 52A (or the engaging hole 52B). The positioning pin 128 is provided on the bottom surface 120*a* of the inner finisher 120 and can protrude in the downward direction from the bottom surface 120*a*.

The positioning pin 128 is constituted of the shaft 128*a* with a predetermined diameter, and the parallel pin 128*b* with a length greater than the diameter of the shaft 128*a*. The parallel pin 128*b* is secured to the shaft 128*a* in the direction crossing the shaft 128*a*.

The positioning pin 128 can be in two states of the one in which the positioning pin 128 is retracted from the bottom surface of the inner finisher 120 and the other in which the positioning pin 128 in protruded from the bottom surface of the inner finisher 120.

Further, the positioning pin 128 is configured to rotate for 90°. In FIG. 16B, it is understood from the phase of the parallel pin 128*b* provided at the tip has been rotated for 90° in the direction of an arrow from the state shown in FIG. 16A.

The engaging hole 52A is disposed such that the engaging hole 52A is opposed to the positioning pin 128 on the bottom surface of the inner finisher 120 in the state where the position of the inner finisher 120 is determined by the engagement of each of the positioning shaft 123, the protrusion 122, and the engaging groove 127.

In this opposed state, the positioning pin 128 is protruded from the bottom surface 120*a* of the inner finisher 120 and is rotated as shown in FIG. 16B. As a result, the parallel pin 128*b* on the tip of the positioning pin 128 is caught by the back surface of the inside lower cover 30 around the engaging hole 52A, so that the floating of the inner finisher 120 is prevented.

With the above configuration, the attaching and detaching of the processing unit to and from the apparatus main body 100 and the fitting of the drawer connector pair can be properly guided, resulting in the reduction of the risk of a connection failure and breakage of the drawer connectors.

(Configuration of Unit Connection Portion of Processing Unit)

In the above described embodiment, the configuration is exemplified in which the inner finisher 120 (or the buffer path unit 130) as one processing unit is attached on the inside lower cover 30 in the inside space of the apparatus main body 100 of the image forming apparatus 1. However, the present invention is not limited to this configuration. For example, the present invention is applicable to the configuration in which multiple processing units are attached on the inside lower cover 30 in the inside space of the apparatus main body 100 of the image forming apparatus 1.

Figure 17:
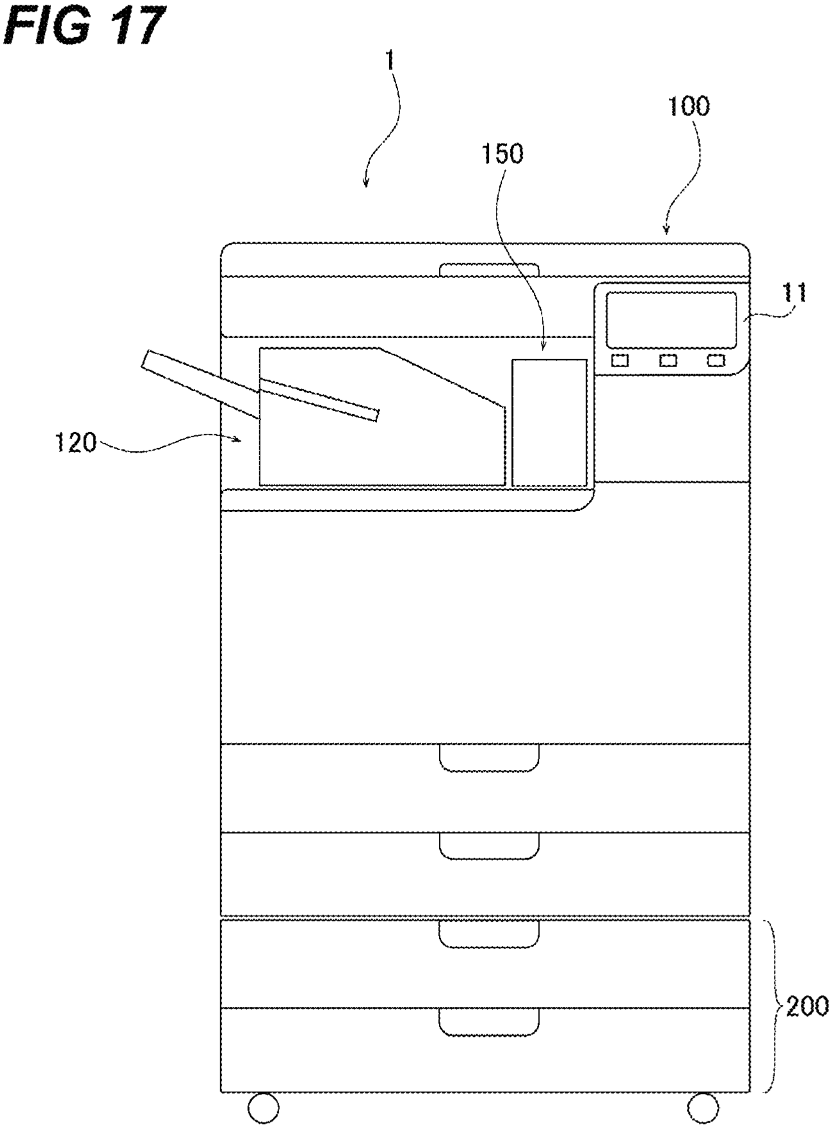
FIG. 17 is a diagram showing a front view of the image forming apparatus and the processing unit.

As shown in FIG. 17, the inner finisher 120 may be installed in the state where the inner finisher 120 is moved in the leftward direction from the state shown in FIG. 2. In FIG. 17, illustrated is the state where the puncher unit 150, which is a processing unit different from the inner finisher 120, is installed between the discharge roller pair 20 and the inner finisher 120. As understood from FIG. 17, the inner finisher 120 has been moved to the leftward for the distance corresponding to the width of the puncher unit 150.

Figure 18:
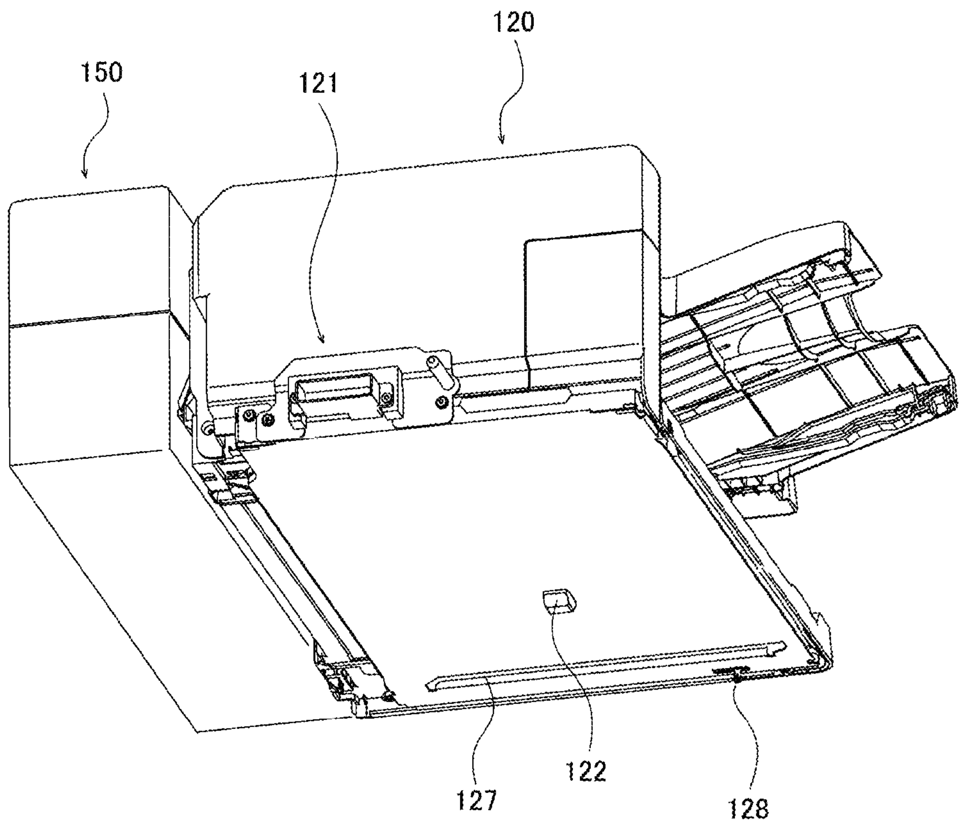
FIG. 18 is a diagram showing a perspective view of the processing unit.

FIG. 18 is a diagram showing the unit connection portion 121 of the inner finisher 120 to be installed in the position as shown in FIG. 17. As understood from FIG. 18, the position of the unit connection portion 121 of the inner finisher 120 shown in FIG. 18 is moved toward the puncher unit 150 side from the position shown in FIG. 5B.

The inner finisher 120 is configured such that the unit connection portion 121 including the drawer connector 126 can be movably disposed at two positions depending on the presence or absence of the puncher unit 150. Namely, the position of the unit connection portion 121 including the drawer connector 126 can be selected from a first position and a second position, which is different from the first position. The first position is one where the drawer connector 126 of the unit connection portion 121 is connected to the drawer connector 42 of the main body connection portion 40 when the protrusion 122 fits into the groove 50A. The second position is one where the drawer connector 126 of the unit connection portion 121 is connected to the drawer connector 42 of the main body connection portion 40 when the protrusion 122 fits into the groove 50B. Namely, the unit connection portion 121 of the inner finisher 120 including the drawer connector 126 can be movably disposed at two positions depending on the installation position of the inner finisher 120 on the inside lower cover 30. As the installation positions of the inner finisher 120, the first installation position with the puncher unit 150 being absent (as shown in FIG. 2) and the second installation position with the puncher unit 150 being present (as shown in FIG. 17) are exemplified.

When the puncher unit 150 is absent, the unit connection portion 121 of the inner finisher 120 with the drawer connector 126 is placed at the first position shown in FIG. 5B corresponding to the first installation position shown in FIG. 2. On the other hand, when the puncher unit 150 is present, the unit connection portion 121 of the inner finisher 120 with the drawer connector 126 is placed at the second position shown in FIG. 18 corresponding to the second installation position shown in FIG. 17, which is different from the first installation position. With this configuration, the drawer connector 126 of the inner finisher 120 can fit with the drawer connector 42 on the apparatus main body side irrespective of the presence or absence of another processing unit.

This applies to the positioning shaft 123 disposed on the unit connection portion 121. Namely, the positioning shaft 123 is provided on the unit connection portion 121 together with the drawer connector 126. Therefore, the positioning shaft 123 can be moved between the first position and second position in the leftward and rightward directions (first directions) on the inner finisher 120 together with drawer connector 126.

The unit connection portion 121 of the inner finisher 120 can be moved between the first position and the second position, which is different from the first position, whereas the protrusion 122 and the positioning pin 128 disposed on the bottom surface 120*a* of the inner finisher 120 are moved with the movement of inner finisher 120.

Therefore, the groove portion of the inner finisher 120 includes the groove 50A as a first groove portion and the groove 50B as a second groove portion, which is formed at a position different from that of the groove 50A in the leftward and rightward directions (first directions). The protrusion 122 of the inner finisher 120 is capable of engaging with any one of the groove 50A and the groove 50B. Accordingly, the protrusion 122 of the inner finisher 120 engages with either one of the groove 50A and the groove 50B when the inner finisher 120 is installed in the inside space of the apparatus main body 100. Between the groove 50A or the groove 50B which does not engage with the protrusion 122 and the bottom surface of the inner finisher 120, a cavity is formed.

Similarly, the floating restricting portion of the inner finisher 120 includes the engaging hole 52A as a first floating restricting portion and the engaging hole 52B as a second floating restricting portion, which is formed at a position different from that of the engaging hole 52A in the leftward and rightward directions (first directions). The positioning pin 128 of the inner finisher 120 engages with either one of the engaging hole 52A and the engaging hole 52B when the inner finisher 120 is installed in the inside space.

Specifically, when the unit connection portion 121 of the inner finisher 120 is placed in the first position shown in FIG. 5B, the protrusion 122 engages with the groove 50A and the positioning pin 128 engages with the engaging hole 52A. On the other hand, the unit connection portion 121 of the inner finisher 120 is placed in the second position shown in FIG. 16, which is different from the first position, the protrusion 122 engages with the groove 50B and the positioning pin 128 engages with the engaging hole 52B.

As shown in FIG. 11, the groove 50B and the engaging hole 52B, which have the same shapes as those of the groove 50A and the engaging hole 52A in the first positions, are respectively placed in the second positions after the unit connection portion 121 is moved, so that the positioning state does not change.

Figure 19:
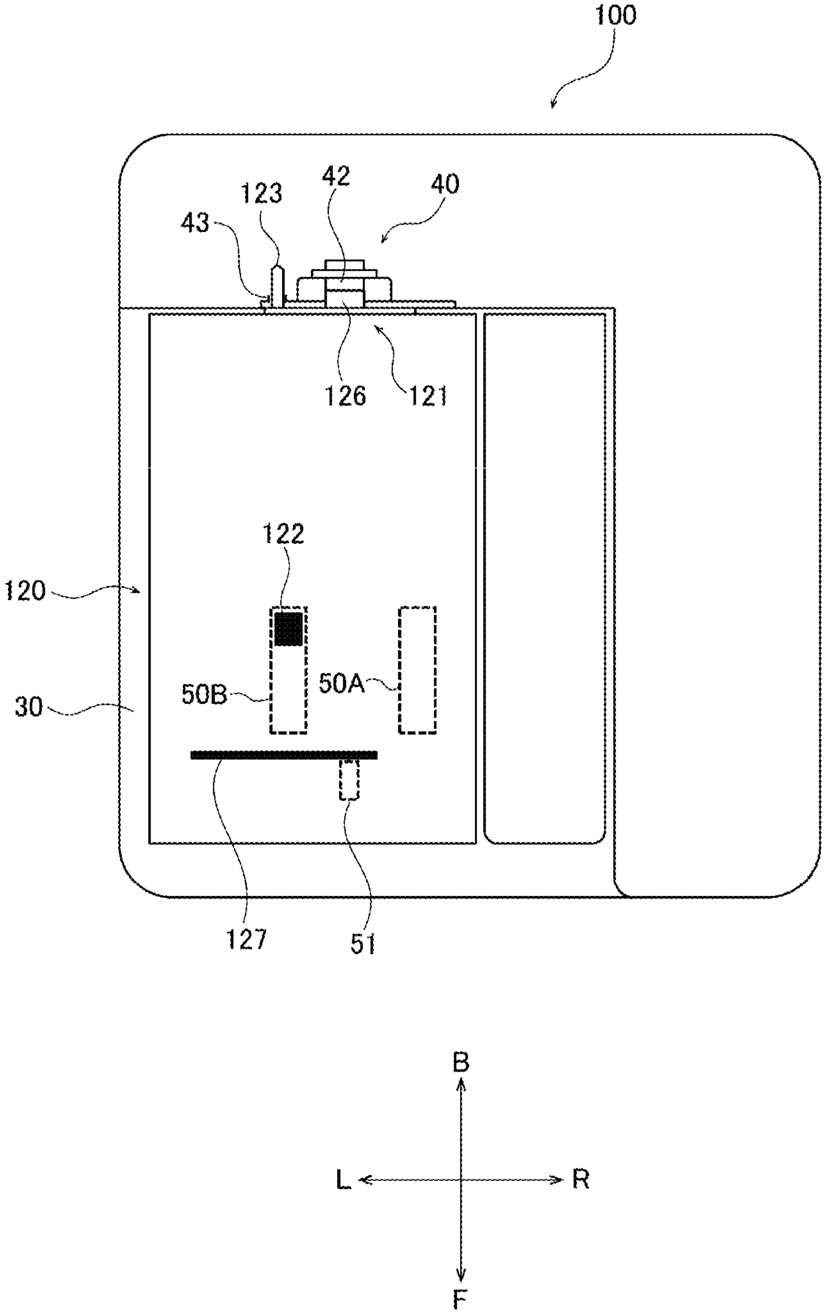
FIG. 19 is a diagram showing a cross-sectional view of the image forming apparatus and the processing unit.

FIG. 19 shows the engaging states of the positioning shaft 123, the protrusion 122, the engaging groove 127 when the puncher unit 150 is installed. It is understood that this configuration is also effective in the same way as in the configuration without the puncher unit 150 (see FIG. 14).

In the above described embodiment, the configuration is exemplified in which the unit connection portion 121 is capable of being disposed in two different positions. However, the invention is not limited to this configuration and the unit connection portion 121 may be capable of being disposed in three or more different positions. In this case, the groove portion and the floating restricting portion, which are the engaging counterparts of the protrusion 122 and the positioning pin 128 are disposed in multiple positions corresponding to the disposition of the unit connection portion 121. Further, in the above described embodiment, the lever 51 and the engaging groove 127, which position the processing unit in the forward and backward directions are disposed on the front side of the protrusion 122. However, the invention is not limited to this configuration and the lever 51 and the engaging groove 127 may be disposed on the back side of the protrusion 122.

Furthermore, the positioning by the positioning shaft 123 is not necessarily required depending on the shape of the protrusion 122. For example, if the protrusion 122 in the forward and backward directions is long enough, the movement of the processing unit can be restricted only with the engagement of the protrusion 122 with the groove 50A (or the groove 50B) without the processing unit being rotated in the leftward and rightward directions, which does not apply a load to the fitting of the drawer connector pair.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-177403, filed Oct. 13, 2023, which is hereby incorporated by reference herein in its entirety.

What is claimed is:

1. An image forming apparatus comprising:

a main unit including an image forming portion configured to form an image on a sheet;

a discharge portion provided on the main unit, the discharge portion being configured to discharge the sheet from the main unit in a first direction; and a processing unit installed on an installation surface of the main unit and configured to process the sheet discharged from the discharge portion, wherein the processing unit includes:

a first connector electrically connected to the main unit; and a first positioning portion that protrudes from a bottom surface of the processing unit toward the installation surface, wherein the main unit includes:

a second connector disposed, in a second direction, on a first side with respect to a sheet discharging position onto which the sheet is discharged from the discharge portion, the second direction crossing the first direction, and the second connector being electrically connected to the processing unit in a manner that the first connector is inserted into the second connector along the second direction; and a groove portion provided on the installation surface and configured to engage with the first positioning portion, wherein the processing unit is capable of moving in the second direction with respect to the main unit in a state where the first positioning portion is engaged with the groove portion, and wherein by the engagement of the first positioning portion with the groove portion, a movement of the processing unit in the first direction with respect to the main unit is restricted to a range narrower than a movable range in the second direction.

2. The image forming apparatus according to claim 1, wherein the main unit includes:

a connector disposing surface on which the second connector is disposed, the connector disposing surface being disposed on the first side with respect to the sheet discharging position in the second direction, and a discharge portion disposing surface on which the discharge portion is disposed, wherein the installation surface, the connector disposing surface and the discharge portion disposing surface define an inside space that includes an opening portion on a second side opposite the first side with respect to the sheet discharging position in the second direction, and wherein the processing unit is installed in the inside space.

3. The image forming apparatus according to claim 1, wherein the groove portion includes a first wall surface and a second wall surface that respectively extend in the second direction, the first wall surface and the second wall surface being opposed to each other in the first direction, and wherein the first positioning portion includes a first side surface that is opposed to the first wall surface in a state where the first positioning portion is fitted in the groove portion and a second side surface that is opposed to the second wall surface in a state where the first positioning portion is fitted in the groove portion.

4. The image forming apparatus according to claim 1, wherein the groove portion includes a first groove portion and a second groove portion that is provided in a position different from that of the first groove portion in the first direction, and wherein the first positioning portion is to engage with any one of the first groove portion and the second groove portion.

5. The image forming apparatus according to claim 1, wherein the groove portion includes a first groove portion and a second groove portion that is provided in a position different from that of the first groove portion in the first direction, and wherein the bottom surface of the processing unit and the second groove portion form a cavity in a state where the first positioning portion is engaged with the first groove portion.

6. The image forming apparatus according to claim 1, wherein the first connector of the processing unit can be installed in a first position on the processing unit and a second position that is different from the first position in the first direction.

7. The image forming apparatus according to claim 6, wherein the processing unit includes a second positioning portion that is to engage with the main unit along the second direction, and wherein the second positioning portion can be moved to the first position or the second position in the first direction on the processing unit together with the first connector.

8. The image forming apparatus according to claim 1, wherein the groove portion includes a first groove portion and a second groove portion that is provided in a position different from that of the first groove portion in the first direction, wherein the first positioning portion is capable of engaging with any one of the first groove portion and the second groove portion, and wherein a position of the first connector on the processing unit can be selected from a first position where the first connector is connected to the second connector when the first positioning portion fits into the first groove portion and a second position where the first connector is connected to the second connector when the first positioning portion fits into the second groove portion.

9. The image forming apparatus according to claim 1, wherein the main unit includes an engaging hole disposed on the first side with respect to the sheet discharging position in the second direction, and wherein the processing unit includes a second positioning portion having a shaft member to be inserted into the engaging hole along the second direction.

10. The image forming apparatus according to claim 9, wherein the state where the first positioning portion is engaged with the groove portion includes a first state where the shaft member of the processing unit is separated from the engaging hole of the main unit and the second connector of the processing unit is separated from the first connector of the main unit, a second state where the shaft member of the processing unit is engaged with the engaging hole of the main unit and the second connector of the processing unit is separated from the first connector of the main unit, and a third state where the shaft member of the processing unit is engaged with the engaging hole of the main unit and the second connector of the processing unit is inserted into the first connector of the main unit, and wherein according as the processing unit relatively moves along the second direction with respect to the main unit, the state where the first positioning portion is engaged with the groove portion changes in an order of the first state, the second state and the third state.

11. The image forming apparatus according to claim 1, wherein the main unit includes a movement restricting portion that is provided on the installation surface and that restricts a movement of the processing unit in a direction opposite an inserting direction of the processing unit.

12. The image forming apparatus according to claim 11, wherein the movement restricting portion includes an engaging portion that is capable of protruding from the installation surface toward the processing unit and that is to engage with the processing unit, and wherein the engaging portion is provided such that the engaging portion is capable of being retracted inwards from the installation surface and is urged toward the processing unit.

13. The image forming apparatus according to claim 11, wherein the main unit includes an urging member that urges the second connector in a direction in which the second connector engages with the first connector, and wherein the movement restricting portion receives an urging force of the urging member.

14. The image forming apparatus according to claim 1, wherein the main unit includes a floating restricting portion that restricts the processing unit from being separated from the main unit in a third direction crossing the first direction and the second direction.

15. An image forming apparatus comprising:

a main unit including an image forming portion configured to form an image on a sheet; and a discharge portion provided on the main unit, the discharge portion being configured to discharge the sheet from the main unit in a first direction, wherein a processing unit configured to process the sheet discharged from the discharge portion is attachable to the image forming apparatus, wherein the main unit includes:

an installation surface on which the processing unit is to be installed, a main body side connector that is disposed, in a second direction, on a first side with respect to a sheet discharging position onto which the sheet is discharged from the discharge portion, the second direction crossing the first direction, and the main body side connector being configured to be electrically connected to the processing unit in a manner that a processing side connector of the processing unit is inserted into the main body side connector along the second direction; and a groove portion that is provided on the installation surface, wherein the processing unit is capable of moving in the second direction with respect to the main unit in a state where a protruding portion protruded from a bottom surface of the processing unit toward the installation surface is engaged with the groove portion, and wherein by the engagement of the protruding portion with the groove portion, a movement of the processing unit in the first direction with respect to the main unit is restricted to a range narrower than a movable range in the second direction.

* * * * *